United States Patent
Ellis et al.

(10) Patent No.: US 12,403,681 B2
(45) Date of Patent: Sep. 2, 2025

(54) FLAME RESISTANT COMPOSITE FABRIC

(71) Applicant: Brookwood Companies Incorporated, New York, NY (US)

(72) Inventors: Laurence Fitch Ellis, Wauregan, CT (US); Thomas C. Colasanto, Wauregan, CT (US); David A. Capwell, Kenyon, RI (US); Barbara Rell Young, New York, NY (US)

(73) Assignee: Brookwood Companies Incorporated, New York, NY (US)

( * ) Notice: Subject to any disclaimer, the term of this patent is extended or adjusted under 35 U.S.C. 154(b) by 229 days.

(21) Appl. No.: 16/789,254

(22) Filed: Feb. 12, 2020

(65) Prior Publication Data

US 2020/0254740 A1 Aug. 13, 2020

Related U.S. Application Data

(60) Provisional application No. 62/804,315, filed on Feb. 12, 2019.

(51) Int. Cl.
*B32B 27/12* (2006.01)
*B32B 5/02* (2006.01)
(Continued)

(52) U.S. Cl.
CPC .............. *B32B 27/12* (2013.01); *B32B 5/024* (2013.01); *B32B 7/12* (2013.01); *B32B 27/08* (2013.01);
(Continued)

(58) Field of Classification Search
CPC ..... B32B 2250/40; B32B 27/12; B32B 5/024; B32B 7/12; B32B 27/08; B32B 27/40;
(Continued)

(56) References Cited

U.S. PATENT DOCUMENTS

| 2010/0151759 A1 | 6/2010 | Capwell |
| 2013/0065470 A1* | 3/2013 | Rock ......................... D01F 6/16 428/221 |

(Continued)

FOREIGN PATENT DOCUMENTS

| CN | 107175869 A | * 9/2017 | .............. B29B 9/06 |
| CN | 106544877 B | 10/2018 | |

(Continued)

OTHER PUBLICATIONS

International Search Report and Written Opinion in corresponding International Patent Application No. PCT/US2020/017990, mailed May 13, 2020 (14 pages).

(Continued)

*Primary Examiner* — Matthew D Matzek
(74) *Attorney, Agent, or Firm* — Greenberg Traurig, LLP (57) ABSTRACT

The present invention is directed to a fabric composite comprising nylon or polyester fibers having flame-retardant properties without sacrificing many of the desirable properties of the fabric composite. The fabric composite may have external fabric layers (e.g., nylon sheets, etc.) each internally coated with a flame-retardant layer and attached to one another through a thermoplastic polyurethane film. The present invention also provides methods of making such fabric composites.

7 Claims, 1 Drawing Sheet (51) Int. Cl.
*B32B 7/12* (2006.01)
*B32B 27/08* (2006.01)
*B32B 27/40* (2006.01)
*B32B 33/00* (2006.01)
*B32B 37/12* (2006.01)
*B32B 37/16* (2006.01)
*B32B 37/26* (2006.01)
*B32B 38/08* (2006.01)

(52) U.S. Cl.
CPC .............. *B32B 27/40* (2013.01); *B32B 33/00* (2013.01); *B32B 37/12* (2013.01); *B32B 37/16* (2013.01); *B32B 37/26* (2013.01); *B32B 38/08* (2013.01); *B32B 2250/05* (2013.01); *B32B 2250/40* (2013.01); *B32B 2260/023* (2013.01); *B32B 2260/04* (2013.01); *B32B 2262/0261* (2013.01); *B32B 2437/00* (2013.01)

(58) Field of Classification Search
CPC ......... B32B 33/00; B32B 37/12; B32B 37/16; B32B 37/26; B32B 38/08; B32B 2250/05; B32B 2260/023; B32B 2260/04; B32B 2262/0261; B32B 2437/00; B32B 3/266; B32B 5/08; B32B 27/304; B32B 27/36; B32B 27/365; B32B 2250/03; B32B 2255/02; B32B 2255/26; B32B 2255/28; B32B 2260/021; B32B 2262/0246; B32B 2262/0276; B32B 2262/04; B32B 2262/062; B32B 2262/067; B32B 2262/101; B32B 2262/14; B32B 2307/21; B32B 2307/402; B32B 2307/51; B32B 2307/54; B32B 2307/554; B32B 2307/558; B32B 2307/718; B32B 2307/724; B32B 2307/7265; B32B 2307/732; B32B 2307/734; B32B 2437/04; B32B 5/022; B32B 5/026; B32B 27/34; B32B 2262/0253; B32B 2262/0269; B32B 2307/5825; B32B 2307/7145; B32B 1/00; B32B 37/04; B32B 2307/3065; B32B 2437/02; B32B 2571/00
USPC ... 442/79–90, 136, 138–147, 226, 227, 239, 442/255, 246
See application file for complete search history.

(56) References Cited

U.S. PATENT DOCUMENTS

2013/0217286 A1* 8/2013 Lubnin .................... C08K 5/05
524/35
2016/0230314 A1* 8/2016 Capwell .................... D01F 6/90

FOREIGN PATENT DOCUMENTS

CN 106638015 B 12/2018
EP 1008447 A2 6/2000

OTHER PUBLICATIONS

NFPA 701 "Standard Methods of Fire Tests for Flame Propagation of Textiles and Films" (2004).
ASTM. "Standard test method for flame resistance of textiles (vertical test)." (2007).
Argotec Product Data Sheet for Polyurethane ST-4228.
https://www.engineeringtoolbox.com/flame-temperatures-gases-d_422.html (downloaded May 10, 2023).

* cited by examiner

FLAME RESISTANT COMPOSITE FABRIC

CROSS REFERENCE TO RELATED APPLICATIONS

The present application claims priority to U.S. Provisional Application No. 62/804,315 filed Feb. 12, 2019, which is hereby incorporated by reference in its entirety.

FIELD OF INVENTION

The present invention is directed to flame-resistant fabric composites and their methods of production. More specifically, the present invention describes flame-resistant fabric composites comprising an internal thermoplastic polyurethane layer and one or more flame-retardant coatings disposed between fabric layers and the thermoplastic polyurethane layer.

BACKGROUND OF INVENTION

Fabrics formed from polyester or nylon fibers have many useful properties including low cost, manufacturability, relatively light weight, dyeability, and wearability, to name but a few. Due to these useful properties, such fabrics have found wide spread use in garment applications. In particular, nylon and polyester fabrics are often used in the manufacture of outer protective garments such as jackets, pants, hats, gloves, and the like.

In some cases, it may also be desirable for the fabric to have fire resistant properties. Various flame-retardant compositions and approaches have developed that can be applied to fabrics to help improve the fire resistance of the fabric to which it is applied. Generally, these compositions and approaches involve the chemical or physical application of a protective coating on the surface of the fabric. These flame-retardant compositions are typically applied to the fabric at a relatively high coat weight in order to obtain the desired flame-retardant properties in the fabric. Many such flame-retardant compositions do not work adequately with respect to polyester and nylon fibers. Many common flame-retardant compositions use a self-extinguishing process after ignition to thereby prevent further ignition of the fabric and the fibers themselves. However, polyester and nylons fibers generally melt before actual ignition of the fibers occurs. As a result, the fibers may melt prior to ignition of the flame-retardant compositions. This can result in melted material from the fibers contacting the skin of the wearer, which in turn can result in burning the wearer's skin.

In some cases, coating the fabric with a flame-retardant composition can reduce the otherwise desirable properties of the fabric, for example, the wearability, weight, and/or flexibility of the fabric. This loss of desirable properties may be particularly amplified in cases where a fabric is treated with both a flame-retardant composition and a water repellant composition.

Composite fabrics too suffer these same issues. However, composite fabrics typically have twice the combustible material surrounding some intermediate core making them more susceptible to such damage. As the outer fabric degrades, the central core may be exposed and also affected by flame resulting in higher likelihood of damage to the entire composite.

Arc flash and flash fire resistant fabrics, and garments made therefrom, need to meet several ASTM specifications and should be tested according to ASTM test methods provided. The ASTM specifications related to arc flash and flash fire resistant fabrics and garments include ASTM D751: "Standard Test Methods for Coated Fabric"; ASTM F1959: "Standard Test Method for Determining the Arc Rating of Materials for Clothing"; ASTM F2733: "Standard Specification for Flame Resistant Rainwear for Protection Against Flame Hazards"; ASTM D6413/D6413M: "Standard Test Method for Flame Resistance of Textiles (Vertical Test)"; ASTM F1891: "Standard Specification for Arc and Flame Resistant Rainwear"; and ASTM F1930: "Standard Test Method for Evaluation of Flame Resistant Clothing for Protection Against Flash Fire Simulations Using an Instrumented Manikin".

SUMMARY

Composite fabrics are provided with increased flame-retardant properties. Methods of producing these composite fabrics are also provided.

The flame-retardant fabric composite may comprise, in order:
  (a) a first woven nylon fabric sheet, optionally impregnated with thiourea formaldehyde flame-retardant and/or a fluorinated durable water repellant (DWR);
  (b) a first flame-retardant polyurethane polymer layer;
  (c) a thermoplastic polyurethane (TPU) layer;
  (d) a second flame-retardant polyurethane polymer layer;
  (e) a second woven nylon fabric sheet, optionally impregnated with thiourea formaldehyde flame-retardant and/or a fluorinated durable water repellant (DWR);
wherein the first and second flame-retardant polyurethane polymer layers each independently comprise (1) an intrinsically flame-retardant polymer, and (2) a flame-retardant additive. In some embodiments, the first and second flame-retardant polymer layers may comprise (1) an intrinsically flame-retardant thermoset polyurethane polymer comprising one or more halogenated monomers (e.g., brominated monomers, etc.), and (2) a flame-retardant additive comprising one or more of a brominated flame-retardant, antimony based flame-retardant (e.g., antimony trioxide, antimony pentaoxide, etc.), metal hydroxide (e.g., aluminum hydroxide), or melamine or a derivative thereof. In some embodiments, the flame-retardant additive comprises one or more of a brominated flame-retardant, antimony trioxide, aluminum hydroxide, or melamine or a derivative thereof. In certain implementations, the adhesive comprises a thermoset aromatic polyurethane polyether. The adhesive layer may further comprise one or more flame-retardant additives (e.g., brominated flame-retardants, antimony based flame-retardants, etc.). In certain embodiments, the composite fabric may be essentially free of one or more specific flame-retardants such as brominated polymeric compounds (e.g., less than 10% brominated polymeric compounds by weight of the composition, less than 5% brominated polymeric compounds by weight of the composition, less than 1% brominated polymeric compounds by weight of the composition, less than 0.1% brominated polymeric compounds by weight of the composite fabric, etc.).

Methods of manufacture for these composites are also provided. The method for manufacturing a flame-retardant fabric composite may comprise:
  providing a woven nylon fabric sheet having a layer of flame-retardant polyurethane polymer on one face thereof,
  applying a layer of thermoplastic polyurethane (TPU) adhesive onto the layer of flame-retardant polyurethane polymer; and adhering a thermoplastic polyurethane film to the adhesive layer, to thereby form a TPU layered nylon fabric. The method may further comprise the step of impregnating the first woven nylon fabric sheet with a thiourea formaldehyde flame-retardant and/or a fluorinated durable water repellant impregnated therein by contacting the laminated fabric with a liquid bath composition comprising a thiourea formaldehyde flame-retardant and/or a fluorinated durable water repellant.

In certain embodiments, the method for manufacturing a flame-retardant fabric composite may comprise:

providing a first woven nylon fabric sheet having a first layer of flame-retardant polyurethane polymer on one face thereof, applying a first layer of polyurethane adhesive (e.g., thermoset polyurethane, thermoplastic polyurethane, etc.) onto the first layer of flame-retardant polyurethane polymer;

adhering a first thermoplastic polyurethane (TPU) film to the adhesive layer, providing a second woven nylon fabric sheet having a second layer of flame-retardant polyurethane polymer on one face thereof, applying a second layer of polyurethane (e.g., thermoset polyurethane, thermoplastic polyurethane, etc.) adhesive onto the second layer of flame-retardant polyurethane polymer;

adhering a second thermoplastic polyurethane film to the adhesive layer, and laminating the first sheet of the TPU layered nylon fabric to the second sheet of the TPU layered nylon fabric by fusing together, interfacially, the first and second thermoplastic polyurethane films.

In some implementations, the method for manufacturing a flame-retardant fabric composite may comprise:

applying a first coating of flame-retardant polyurethane polymer to one face of a first woven nylon fabric, applying a first layer of polyurethane (e.g., thermoset polyurethane, thermoplastic polyurethane, etc.) adhesive onto the first coating of flame-retardant polyurethane polymer;

adhering a first thermoplastic polyurethane (TPU) film to the adhesive layer to make a first film-coated fabric, applying a second coating of flame-retardant polyurethane polymer on one face of a second woven nylon fabric, applying a second layer of polyurethane (e.g., thermoset polyurethane, thermoplastic polyurethane, etc.) adhesive onto the second coating of flame-retardant polyurethane polymer;

adhering a second thermoplastic polyurethane (TPU) film to the adhesive layer to make a second TPU layered nylon fabric, and laminating the first and second TPU layered nylon fabrics together, interfacially, by fusing the first and second thermoplastic polyurethane films.

In some embodiments, the intermediate TPU layered nylon fabrics are provided as they are useful in the production of the flame-retardant composites. The TPU layered nylon fabrics may comprise:

(a) a first woven nylon fabric sheet, optionally impregnated with thiourea formaldehyde flame-retardant and/or a fluorinated durable water repellant (DWR);

(b) a first flame-retardant polyurethane polymer layer;

(c) a thermoplastic polyurethane (TPU) layer;

wherein the flame-retardant polyurethane polymer layers comprise (1) an intrinsically flame-retardant polymer, and (2) a flame-retardant additive. In some embodiments, the flame-retardant polymer layer may comprise (1) an intrinsically flame-retardant thermoset polyurethane polymer comprising one or more halogenated monomers (e.g., brominated monomers, etc.), and (2) a flame-retardant additive comprising one or more of a brominated flame-retardant, antimony based flame-retardant (e.g., antimony trioxide, antimony pentaoxide, etc.), metal hydroxide (e.g., aluminum hydroxide), or melamine or a derivative thereof. In certain implementations, the adhesive comprises a thermoset aromatic polyurethane polyether. The adhesive layer may further comprise one or more flame-retardant additives (e.g., brominated flame-retardants, antimony based flame-retardants, etc.).

DETAILED DESCRIPTION

Detailed embodiments of the present invention are disclosed herein; however, it is to be understood that the disclosed embodiments are merely illustrative of the invention that may be embodied in various forms. In addition, each of the examples given in connection with the various embodiments of the invention is intended to be illustrative, and not restrictive.

All terms used herein are intended to have their ordinary meaning in the art unless otherwise provided. All concentrations are in terms of percentage by weight of the specified component relative to the entire weight of the topical composition, unless otherwise defined.

As used herein, "a" or "an" shall mean one or more. As used herein when used in conjunction with the word "comprising," the words "a" or "an" mean one or more than one. As used herein "another" means at least a second or more.

As used herein, all ranges of numeric values include the endpoints and all possible values disclosed between the disclosed values. The exact values of all half integral numeric values are also contemplated as specifically disclosed and as limits for all subsets of the disclosed range. For example, a range from 0.1% to 3% (or between 0.1% and 3%) specifically discloses a percentage of 0.1%, 1%, 1.5%, 2.0%, 2.5%, and 3%. Additionally, a range of 0.1 to 3% includes subsets of the original range including from 0.5% to 2.5%, from 1% to 3%, from 0.1% to 2.5%, etc. It will be understood that the sum of all weight % of individual components will not exceed 100%.

By "consist essentially" it is meant that the ingredients include only the listed components along with the normal impurities present in commercial materials and with any other additives present at levels which do not affect the operation of the invention, for instance at levels less than 5% by weight, typically less than 1% or even 0.5% by weight. For example, polyurethane particles that consist essentially of one or more specific polyurethanes (e.g., polycarbonate polyurethane and/or polyether polyurethane, etc.) may have more than 90% or more than 95% of the one or more specific polyurethanes by weight of the polyurethane particles.

The flame-retardant fabric composite may comprise (e.g., in order, etc.):

(a) a first woven nylon fabric sheet, optionally impregnated with thiourea formaldehyde flame-retardant and/or a fluorinated durable water repellant (DWR);

(b) a first flame-retardant polyurethane polymer layer;

(c) a thermoplastic polyurethane (TPU) layer;
(d) a second flame-retardant polyurethane polymer layer;
(e) a second woven nylon fabric sheet, optionally impregnated with thiourea formaldehyde flame-retardant and/or a fluorinated durable water repellant (DWR);

wherein the first and second flame-retardant polyurethane polymer layers each independently comprise (1) an intrinsically flame-retardant thermoset polyurethane polymer comprising one or more halogenated monomers, and (2) a flame-retardant additive comprising one or more of a brominated flame-retardant, antimony trioxide, aluminum hydroxide, or melamine or a derivative thereof. In some embodiments, the flame-retardant fabric composite may comprise a first thermosetting polyurethane polymer adhesive layer disposed between the first flame-retardant polyurethane polymer layer and the thermoplastic polyurethane layer; and a second thermosetting polyurethane polymer adhesive layer disposed between the second flame-retardant polyurethane polymer layer and the thermoplastic polyurethane layer. It will be understood that numeric identifiers to components of the composite or methods (e.g., adhesive layers, flame-retardant layers, TPU layered nylon fabrics, etc.) such as "first" and "second" are intended for identification of those components, but do not indicate any numeric order of those components. In certain implementations, the first and/or second woven nylon fabric sheets are impregnated with a thiourea formaldehyde flame-retardant. Additionally, the first and/or second woven nylon fabric sheets may be impregnated with a fluorinated durable water repellant. Each nylon sheet may independently have a denier of less than 1680 (e.g., from 100 to 1050, 500, 1000, less than 1050, etc.). In some embodiments, the first and second nylon fabrics have the same denier. In other embodiments, the first and second nylon fabrics have different deniers. For example, one nylon fabric may have a denier of 500 and the other may have a denier of 1000. In certain embodiments, each of the first and second woven nylon fabric sheets are composed of 500 denier nylon yarns. In some embodiments, the intrinsically flame-retardant polyurethane polymer comprises one or more brominated monomers. In some embodiments, the thermoplastic polyurethane layer comprises two laminated thermoplastic polyurethane films fused together.

Figure 1:
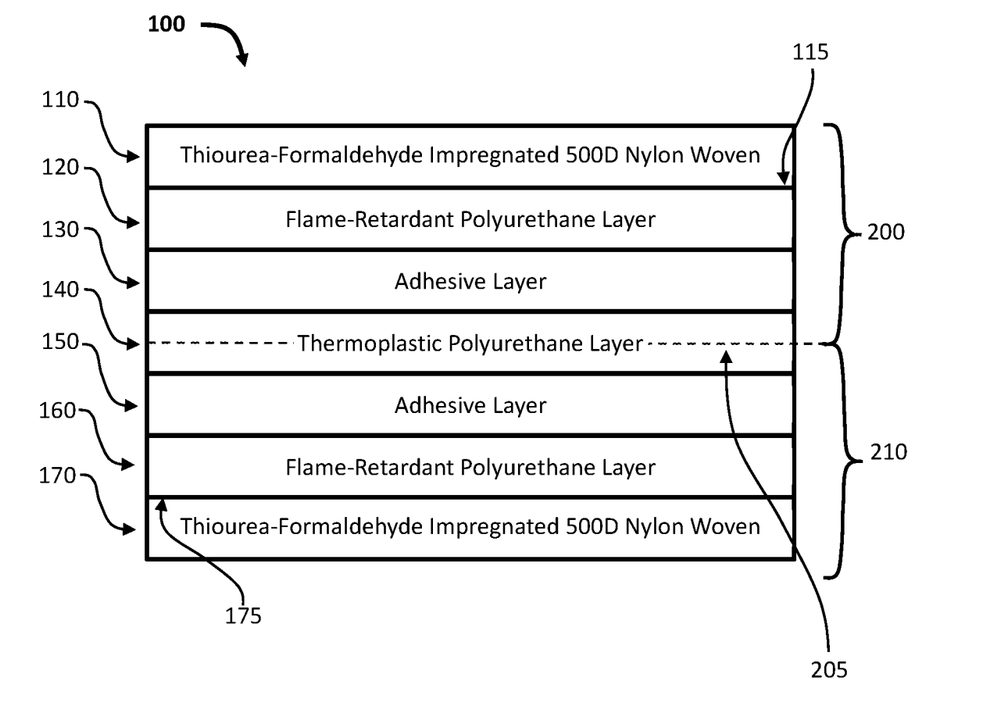
FIG. 1 is a cross sectional view (not to scale) of an embodiment flame-retardant fabric composite.

Referring now to FIG. 1, a flame-retardant fabric composite 100 is illustrated. Flame-retardant fabric composite 100 comprises nylon woven layers 110 and 170. As can be seen, these may be considered the first and second fabric sheets of the flame-retardant fabric composite. These woven nylon fabrics are on the external edges of the composite. In the embodiment depicted, nylon fabrics 110 and 170 500 D and impregnated with thiourea-formaldehyde. In some embodiments, the nylon fabrics are different (e.g., they have different denier, etc.). In the embodiment depicted, nylon fabrics 110 and 170 are further impregnated with a fluorinated durable water repellent such as fluorinated hexamethyl polyacrylate. Coated on the interior facing surfaces of nylon fabrics 110 and 170 (interfaces 115 and 175, respectively) are flame-retardant polyurethane layers 120 and 160, respectively. These flame-retardant polyurethane layers (which may be considered the first and second flame-retardant polyurethane layers) may comprise an intrinsically flame-retardant polyurethane (such as a thermoset halogenated polyurethane produced, for example, with brominated monomer units) and/or one or more flame-retardant additives such as one or more of a brominated flame-retardant, antimony based flame-retardants (e.g., antimony trioxide, antimony pentaoxide, etc.), aluminum hydroxide, or melamine or a derivative thereof. In some embodiments, the flame-retardant polyurethane layers may each have a dry weight from 1 to 5 oz/yd$^2$ (e.g., from 3 to 4 oz/yd$^2$, 2.5 oz/yd$^2$, etc.). In this embodiment, flame-retardant polyurethane layers 120 and 160 are attached to thermoplastic polyurethane layer 140. In the embodiment depicted, flame-retardant polyurethane layers 120 and 160 are adhered to the thermoplastic polyurethane layer through the adhesive layers 130 and 150, respectively. Adhesive layers 130 and 150 may be considered the first and second adhesive layers. As can be seen, the adhesive layer may be disposed between the flame-retardant polyurethane layer and the thermoplastic polyurethane layer. In some embodiments, the adhesive layer may comprise an adhesive polyurethane such as an aromatic polyether polyurethane resin. In certain implementations, the adhesive layer further comprises one or more flame-retardant additives such as brominated flame-retardants. Flame-retardant composite fabric 100 may be formed from the interfacial fusion which occurs from laminating two TPU layered nylon fabrics together. In the embodiment depicted, TPU layered nylon fabric 200 and TPU layered nylon fabric 210 are laminated together to form flame-retardant composite fabric 100, wherein the two thermoplastic polyurethane films are fused together, interfacially, at interface 205.

Fabric

A wide variety of natural and synthetic fabrics are known and may be used as the fabric layer or layers in the present invention, for example, for constructing garments, such as sportswear, rugged outerwear and outdoor gear, protective clothing, etc. (for example, gloves, aprons, chaps, pants, boots, gators, shirts, jackets, coats, socks, shoes, undergarments, vests, waders, hats, gauntlets, sleeping bags, tents, etc.). Typically, vestments designed for use as rugged outerwear have been constructed of relatively loosely-woven fabrics made from natural and/or synthetic fibers having a relatively low strength or tenacity (for example, nylon, cotton, wool, silk, polyester, polyacrylic, polyolefin, etc.). Each fiber can have a tensile strength or tenacity of less than 8 g/Denier (gpd), more typically less than 5 gpd, and in some cases below 3 gpd. Such materials can have a variety of beneficial properties, for example, dyeability, breathability, lightness, comfort, and in some instances, abrasion-resistance.

Different weaving structures and different weaving densities may be used to provide several alternative woven composite fabrics as a component of the invention. Weaving structures such as plain-woven structures, reinforced plain woven structures (with double or multiple warps and/or wefts), twill woven structures, reinforced twill woven structures (with double or multiple warps and/or wefts), satin woven structures, reinforced satin woven structures (with double or multiple warps and/or wefts), knits, felts, fleeces and needle punched structures may be used. Stretch woven, ripstops, dobby weaves, jacquard weaves, are also suitable for use in the present invention.

The fabric sheet material employed in the practice of the invention may be comprised of a variety of fibers, such as flame-resistant type fibers, including flame-resistant polyester fibers, modacrylic fibers and aramid fibers, like nylon, and blends thereof. Other synthetic fibers and combinations may also be employed; however, typically the fibers employed are fiber blends wherein the polyester represents more than 50% of the blend, while the more expensive modacrylic, particularly the aramid fibers, are employed in limited amounts due to their cost or the aramid fiber complete eliminated. For example, the aramid fibers are generally not necessary, but could be used at up to 5% by volume of the fiber blend. A combination of fibers is used in the non-woven substrate in order to achieve an optimum balance of flame resistance, cost and performance. Natural, non-woven fibers, such as cellulosic fiber, and particularly cellulosic fiber treated to be flame resistant, such as by the application of a flame-retardant agent like silicic acid or other agent, may be used to include modified viscose (rayon) fibers with silicic acid. These flame-retardants may be impregnated into the fabric using the finishing baths described herein.

The woven fibrous sheet material generally comprises a stretchable fibrous sheet material, such as, but not limited to a knitted-type fabric with closed loop arrangement. The woven or stretchable fibrous sheet material is required to impart tailorability, wrinkle recover and to aid in puncture resistance to the composite fiber material. The stretchable sheet material may be composed of natural or synthetic fibers or mixed, but preferably is a knitted, synthetic fiber, for example, containing polyester fiber or blends. It has been found that the employment of glass fiber sheet material in the composite fabric material tends to add rigidity and reduces the tailorability and wrinkle recovery of the composite fabric sheet material in use as a surface covering, particularly in use as foam seat covering material.

One fabric of the invention may contain yarn having a ratio of cellulose to nylon within the yarn from 60:40 to 70:30. Particular embodiments of the fabrics of the invention include fabrics having weights from 3 to 10 oz/yd$^2$ (e.g., 4 to 8 oz/yd$^2$, etc.), and thicknesses from 0.015 to 0.030 inches. Fabrics of the invention may include those of single ply yarns having a cotton count from 5 to 60.

The fabric of the invention may include aramid staple, with aramid staple replacing a portion of the nylon or cellulosic staple fibers in the intimate blend. Nylon staple fibers suitable for use in fabrics of the invention include nylon 6 and/or nylon 6,6, including for example, those with tensile strength of at least 3.0 grams per denier. In some embodiments, the first fabric sheet is nylon. In some embodiments, the second fabric sheet is nylon. In some embodiments, the first and the second fabric sheet are each nylon. In some embodiments, the denier of the yarns of the fabric may range from 20 denier (or less) to 1200 denier (e.g., from 100 to 300 denier, from 300 to 500 denier, from 500 to 700 denier, from 500 to 1000 denier, from 100 to 500 denier, from 100 to 1000 denier, etc.). In certain implementations, the fabric composite may comprise a first and second woven fabric, wherein the first woven fabric comprises nylon yarns having a 500 denier and the second woven fabric comprises nylon yarns having 500 denier. In some implementations, the fabric composite may comprise a first and second woven nylon fabric, wherein the first woven nylon fabric comprises nylon yarns having a 500 denier and the second woven nylon fabric comprises nylon yarns having 500 denier.

The use of high tensile strength nylon staple can advantageously result in fabrics with exceptional durability as measured by abrasion resistance and bursting strength. Fabrics of the invention may also include those knitted from separate multiple yarns or from a plied yarn, wherein the multiple yarns or plied yarn comprises at least a first yarn made from a blend of cellulosic and nylon staple fibers in a cellulosic to nylon staple fiber ratio from 55:45 to 85:15, and at least a second yarn comprised of nylon filament, provided that such nylon filament yarn does exceed 15% by weight of the total cellulosic and nylon content of the fabric; and the ratio of cellulosic to nylon staple in the first intimately blended yarn is adjusted such that the nylon filament plus staple content of the fabric does not exceed 45% by weight based on the total cellulosic and nylon content of the fabric.

In certain embodiments, the nylon is dyed and printed prior to coating. In certain embodiments, the fabric may have a camouflage pattern. Specifically, in military applications, in addition to a camouflage pattern, it may be desirable to reduce the infrared signature of the fabric composite. Such reduction may be achieved by incorporation of an agent that absorbs or scatters infrared radiation into the flame-retardant fabric composite. In some embodiments, the flame-retardant polymer layer of the fabric composite may comprise such an agent to decrease the IR signatures. For example, carbon black may be added to the flamer-retardant polymer layer. In some embodiments, the flame-retardant polymer layer comprises from 0.1% to 10% black pigment (e.g., from 0.5% to 5%, from 1% to 4%, etc.) by weight of the flame-retardant polymer layer. In some embodiments, the flame-retardant polymer layer comprises from 0.1% to 10% carbon black (e.g., from 0.5% to 5%, from 1% to 4%, etc.) by weight of the flame-retardant polymer layer.

The fabric used in the flame-retardant fabric composite may also comprise electrostatic discharge yarn such that the fabric composite has antistatic properties preventing the transfer of electrical charge from the fabric composite. The electrostatic discharge yarn may be incorporated in an amount to make the fabric compose an electrostatic discharge fabric composite. Suitable electrostatic discharge yarns may be surface coated with carbon particles. For example, epitropic yarn (Nm 34/1 carbon coated polyester) and multifilament yarns made from surface saturated nylon with carbon particles may be used as electrostatic discharge yarns.

In some embodiments, the fabric composite also comprises an anti-microbial agent. Anti-microbial/anti-pathogen resistance may be added to composite materials by the incorporation of one or more of anti-microbial agents added or coated onto the polymer resins, or fabrics, and anti-microbial treatments to the fibers, monofilaments, threads or tows used for a composite material. Typical materials include OXiTitan antimicrobial, nano-silver compounds, sodium pyrithione, zinc pyrithione, 2-fluoroethanol, 1-bromo-2-fluoroethane, benzimidazole, fleroxacin, 1,4-butanedisulfonic acid disodium salt, 2-(2-pyridyl)isothiourea N-oxide hydrochloride, various quaternary ammonium salts, 2-pyridinethiol-1-oxide, compound zinc pyrithione, compound copper pyrithione, magnesium pyrithione, bispyrithione, pyrithione, .alpha.-Bromo Cinnam-Gel (ABC agent, e.g. from KFO France Co, Ltd.), and mixtures thereof. In various embodiments, fiber forms such as threads, tows and monofilaments can be treated with silver nano particles, or can have silver coatings applied via chemical or electrical plating, vacuum deposition or coating with a silver compound containing polymer, adhesive or sizing. Other anti-microbial/anti-pathogen materials not listed herein may also be suitable. In some embodiments, the anti-microbial agent may be incorporated into the flame-retardant polymer layer. In some embodiments, the anti-microbial agent may be incorporated into the adhesive layer. In some embodiments, the anti-microbial agent may be impregnated into the fabric (e.g., by incorporation into the liquid bath for impregnation of the thiourea-formaldehyde, etc.).

Thermoplastic Polyurethane (TPU)

Typically, the center of the composite fabric comprises one or more viscoelastic materials. Without wishing to be bound by theory, it is believed that the viscoelastic material (e.g., thermoplastic polyurethane, etc.) melts in the vicinity of the cut such that it can bond to the loose portions of the yarns thereby producing a cut or aperture that is resistant to fraying and tear. Coatings and nylon surrounding the viscoelastic material may have flame-retardant properties that are balanced with the tear resistance of the total composite. Accordingly, the such laser cuts may be shaped into specific forms to allow attachment of articles to the composite fabric without tearing. For example, the laser cuts may be formed into eyelets allowing for hanging various types of external gear. Moreover, additional reinforcement such as the use of grommets or stitching may not be necessary on the laser cut eyelets because of the inherent resistance to fraying and tear imparted by the inventive fabric composites.

The viscoelastic material may be a thermoplastic polyurethane, or other polymer, such acrylic, or latex rubber. The thermoplastic polymer film may also be of any desired composition, e.g. polyester, polyvinyl chloride or fluoride, polycarbonate, nylon, or polyurethane. Polyurethane films, typically thermoplastic polyurethane films, are available for use with such desirable properties as toughness, elasticity, clarity (including clarity after stretch or stretch/recovery), and chemical reactivity. The films which are used may be colored, printed, clear, smooth, textured, or perforated/pinholed films. The thickness of such films can be widely varied and will depend on the product desired. A typical example is polyurethane film of two mils to 100 mils thickness for use in the flame-retardant composite fabric, although it will be appreciated that other types of films and thickness can be used.

Suitable thermoplastic polyurethanes include polyester based or polyether based polyurethanes. The TPU may be prepared such that the polyisocyanate component of the TPU comprises a diisocyanate; the chain extender component, when present, comprises a diol, a diamine, or a combination thereof; and where the polyol component, when present, comprises a polyether polyol, a polyester polyol, a polycarbonate polyol, a polysiloxane polyol, or a combination thereof. In some embodiments the TPU may be formed from polyisocyanate components including methylene diphenyl diisocyante, 4,4'-methylene dicyclohexyl diisocyante, hexamethylene diisocyanate, toluene diisocyanate, isophorone diisocyanate, lysine diisocyanate, 1,4-butatediisocyanate, 1,4-phenyldiisocyanate, trans-cyclohexane-1,4-diisocyanate, 0-tolidine diisocyanate, naphthalene-1.5-diisocyanate or combinations thereof; the chain extender component, when present, may be formed from ethylene glycol, butanediol, hexamethylenediol, pentanediol, heptanediol, nonanediol, dodecanediol, ethylenediamine, butanediamine, hexamethylenediamine, or a combination thereof; and the polyol component, when present, may be formed from poly(ethylene glycol), poly(tetramethylene glycol), poly(trimethylene oxide), ethylene oxide capped poly(propylene glycol), poly(butylene adipate), poly(ethylene adipate), poly(hexamethylene adipate), poly(tetramethylene-co-hexamethylene adipate), poly(3-methyl-1, 5-pentamethylene adipate), polycaprolactone diol, poly(hexamethylene carbonate) glycol, poly(pentamethylene carbonate) glycol, poly(trimethylene carbonate) glycol, dimer fatty acid based polyester polyols, vegetable oil based polyols, poly(dimethyl siloxane) polyol, or any combination thereof. In particular embodiments, the thermoplastic polyurethane is a polyether aromatic polyurethane such as ST-4228 available from Argotec. Other polyurethanes are available with trade names including Epamould, Elastollan, Pearlthane, Desmopan, Estane, Pellethane, Irogran, exelast EC, Laripur, Avalon, Isothane, Zythane, TPU 95A, Boost, and Luvosint.

Adhesive Layer

In most embodiments, the fabric is adhered to the thermoplastic polyurethane through an adhesive layer. For example, the adhesive layer may serve to adhesively bond the filaments of the textile substrate so they do not comb or unravel and couple to the thermoplastic polyurethane. The adhesive layer may be any suitable adhesive, including but not limited to a water-based adhesive, a solvent-based adhesive, and a heat or UV activated adhesive. The adhesive may be applied as a free-standing film, a coating (continuous or discontinuous, random or patterned), a powder, or any other known means.

The adhesive layer may comprise a polyurethane with adhesive properties. Suitable polyurethanes may be selected from among aliphatic and aromatic polyether and polyester polyurethanes, preferably those having a solids content from 30% to 80%, by weight. An exemplary adhesive polyurethane is Larithane CS38S available from Novotex. In some embodiments, the adhesive is formed from a composition having from 30% to 80% polyurethane (e.g., polyether polyurethane resin, etc.) by weight of the composition. In some embodiments, the polyurethane coating weight applied is 0.3 ounces/square yard to 1.5 ounces/square yard (e.g., 0.5 ounces/square yard, etc.). The adhesive layer may entirely cover or substantially cover (e.g., cover more than 70% more than 80% more than 90%, more than 95%, more than 95%, etc.) of the surface of the fabric and/or the thermoplastic polyurethane. In some embodiments, the adhesive layer may be a partial coating designed to coincide with a particular area of the fabric. Also particular patterns, such as stripes, wavy lines, etc., with different coating weights can be employed.

The adhesive layer may also include one or more flame-retardants. Any flame-retardant additive described herein may be used in the adhesive layer as well. For example, the adhesive layer may comprise one or more brominated flame-retardants and/or antimony based flame-retardants. In some embodiments, the composition to form the adhesive layer comprises from 20 to 60% polyurethane (e.g., aromatic polyether polyurethane resin, etc.), from 10% to 30% brominated flame-retardant (e.g., ethyl-bis tetrabromophthalimide, etc.), and from 1% to 15% antimony trioxide by weight of the composition. Additional chemistries, including metallic salt extinguisants, melamine-based flame-retardants, brominated flame-retardants, hydroxides, and other flame-retardants, may be used in conjunction with the halogenated polyurethane and present in the adhesive layer.

Flame-Retardant Polyurethane Layer

In most embodiments, the composite fabric comprises one or more flame-retardant polyurethane layers. Typically, these layers may be disposed between the thermoplastic polyurethane layer and the fabric itself. The polyurethanes of the flame-retardant polyurethane layer may comprise thermoset polyurethanes. The thermoset polyurethane may be intrinsically flame-retardant (e.g., films made of the polyurethane have flame-retardant properties as measured by ASTM D6413, etc.). In certain embodiments, the thermoset polyurethane is a halogenated polyurethane.

Halogenated polyurethanes contain halogenated moieties in the polymer. These polyurethanes may be prepared by employing halogenated diols and/or halogenated diisocyanate reactants as polyurethane polymerization reactants. Halogen-containing diols suitable for the production of halogenated polyurethanes include chlorine, bromine and iodine substituted low molecular weight aliphatic and aromatic glycols, polyester diols and polyether diols. Specific examples include mono-, di-, and tribromo neopentyl glycol;

ester diols based on diethylene glycol, propylene glycol and tetrabromophthalic anhydride; and ethylene oxide adduct of tetrabromobisphenol-A. Similar chloro-, fluoro-, and iodo-glycols can also be used. Another method for producing polyurethanes containing halogenated moieties employs halogenated diisocyanate reactants in the polymerization reaction. Examples of suitable halogenated diisocyanates include dibromo diphenylmethane diisocyanate, tetrabromo diphenylmethane diisocyanate, dibromo dicyclohexylmethane diisocyanate and tetrabromo dicyclohexylmethane diisocyanate. In some embodiments, the polyurethane may be a brominated aromatic polyester polyurethane. For example, the polyurethane may be synthesized from an aromatic diisocyante (e.g., toluene diisocyante, monobrominated toluene diisocyanate, etc.), a polyester polyol, and a brominated diol (e.g., ester diols based on tetrabromophthalic anhydride, etc.). The halogenated polyurethane may be for example, the halogenated polyurethane with tradename SF-1300. Suitable polyurethanes may be prepared as disclosed in U.S. Pat. No. 9,434,884, hereby incorporated by reference in its entirety and specifically in relation to halogenated polyurethanes.

The halogen-containing polymerization reactants may be employed in an amount which provides the final polyurethane with sufficient halogenated moieties to maintain adhesive characteristics and/or to provide flame retardancy. For example, the polymer may contain at least 1% percent halogen by weight of the polymer. Higher amounts (e.g., more than 5%, more than 10%, more than 15% by weight, etc.) of halogenated moieties can be incorporated into the halogenated polyurethanes with the exact amount determined by the balance of properties desired.

A variety of flame-retardant components can be incorporated into the flame-retardant and/or adhesive layers between the thermoplastic polyurethane and the fabric. In general, the flame-retardant adhesive composition includes one or more flame-retardants in combination with auxiliary chemicals or agents. The auxiliary chemicals or agents are used for applying the flame-retardant to the fabric substrate. The auxiliary agents may comprise, for instance, one or more carriers, solvents, or the like. Flame-retardants that can be used according to the present disclosure include inorganic flame-retardants, such as aluminum oxide, magnesium hydroxide, and ammonium polyphosphate; halogenated flame-retardants such as bromine and chlorine compounds; organophosphorus flame-retardants such as phosphate esters; nitrogen-based organic flame-retardants, and the like. For example, the flame-retardant and/or adhesive layer may be essentially free of one or more flame retardants selected from inorganic flame-retardants such as aluminum oxide, magnesium hydroxide, and ammonium polyphosphate; halogenated flame-retardants such as bromine and chlorine compounds or bromine and brominated and/or chlorinated polymers; organophosphorus flame-retardants such as phosphate esters; nitrogen-based organic flame-retardants, and the like.

Chlorinated flame-retardant compounds, such as chlorinated hydrocarbons, chlorinated phosphate esters, chlorinated polyphosphates, chlorinated organic phosphonates, chloroalkyl phosphates, polychlorinated biphenyls, polychlorinated dibenzo-p-dioxins and dibenzofurans are molecules containing a high concentration of chlorine that generally act chemically in the gas phase. They are often used in combination with antimony trioxide and/or zinc borate as a synergist. Three main families of chlorinated compounds include: (a) chlorinated paraffins; (b) chlorinated alkyl phosphates; and (c) chlorinated cycloaliphatic compounds.

Examples of chlorinated compounds include dodecachlorodimethano-dibenzocyclooctane, tris(2-chloroethyl)phosphate, tris(2-chloro-1-methylethyl)phosphate, tris(2-chloro-1-(chloromethyl)ethyl)phosphate (TDPP), tris(chloropropyl)phosphate, tris(dichloropropyl)phosphate, tris(2-chloroethyl)phosphite, ammonium chloride, chlorendic acid, chlorendic anhydride, tris(dichlorobropropyl)phosphite, Bis(hexachlorocyclo-pentadieno)cyclo-octane, tris-(2-chloroethyl)-phosphite, tris(dichloropropyl)phosphite, bis[bis(2-chloroethoxy)-phosphinyl]isopropylchloro-ethyl phosphate and Mirex (1,1a,2,2,3,3a,4,5,5,5a,5b,6-dodecachloroocta-hydro-1,3,4-metheno-1-H-cyclobuta(cd)pentalene).

Brominated flame-retardant compounds, such as brominated organic compounds and brominated hydrocarbons, exhibit flame-retardant efficiency in many materials. The brominated flame-retardant may be one of: (a) aliphatic brominated compounds; (b) aromatic brominated compounds; and (c) brominated epoxy flame-retardants. Aliphatic brominated compounds include, for example, trisbromoneopentylphosphate, trisbromoneopentyl alcohol, dibromoneopentyl glycol, hexabromocyclohexane, hexabromocyclododecane, tetrabromo cyclopentane, hexabromo cyclohexane, hexabromo cyclooctane, hexabromo cyclodecane and hexabromo cyclododecane. Aromatic brominated compounds include, for example, hexabromobenzene, decabromobiphenyl, octabromodiphenyl oxide, hexabromobenzene, tris(tribromophenyl)cyanurate (e.g., 2,4,6-tris(2,4,6-tribromophenoxy)-1,3,5-triazine), etc.), and tetrabromobisphenol A. The flame-retardant may be poly (pentabromobenzyl acrylate), pentabromodiphenyl ether, octabromodiphenyl oxide, octabromodiphenyl ether, decabromodiphenyl ethane, decabromodiphenyl ethane, decabromodiphenyl oxide, decabromodiphenyl ether, and tetrabromobisphenol A. The flame-retardant may be a brominated epoxy flame-retardant such as brominated epoxy oligomers and polymers.

Suitable brominated flame-retardant compounds include brominated diphenyl ethers, polybrominated diphenyl ethers, dimethyl-3-(hydroxymethylamino)-3-oxopropyl phosphonate, pentabromo toluene, tetrabromo chlorotoluene, pentabromo phenol, tribromo aniline, dibromobenzoic acid, pentabromotoluene, decabromodiphenyl oxide, tribromophenol, hexabromocyclododecane, brominated phosphorous, ammonium bromide, decabromobiphenyl oxide, pentabromobiphenyl oxide, decabromobiphenyl ether, bis (2,3 dibromo propyl ether), dibromoneopentyl glycol, 2,3-dibromopropanol, octabromobiphenyl ether, octabromodiphenyl oxide, tetrabromobiphenyl ether, hexabromocyclododecane, bis(tetrabromophthalimido)ethane, bis(tribromophenoxy)ethane, brominated polystyrene, brominated epoxy oligomer, polypentabromobenzyl acrylate, tetrabromobisphenol compounds, dibromopropylacrylate, dibromohexachlorocyclopentadienocyclooctane, N'-ethyl(bis)dibromononboranedicarboximide, decabromodiphenyloxide, decabromodiphenyl, hexabromocyclohexane, hexabromocyclododecane, tetrabromo bisphenol A, tetrabrombisphenol S, N'N'-ethylbis(dibromononbornene) dicarboximide, hexachlorocyclopentadieno-dibromocyclooctane, tetrabromodipenta-erythritol, pentabromoethylbenzene, decabromodiphenyl ether, tetrabromophthalic anhydride, hexabromobiphenyl, octabromobiphenyl, pentabro mophenyl benzoate, bis-(2,3-dibromo-1-propyl)phthalate, tris(2,3-dibromopropyl) phosphate, N,N'-ethylene-bis- (tetrabromophthalimide), tetrabromophthalic acid diol[2-hydroxypropyl-oxy-2-2-hydroxyethyl-ethyltetrabromophthalate], polybrominated biphenyls, tetrabromobisphenol A, tris(2,3-dibromopropyl)phosphate, tris(2-chloroethyl)phosphite, tris(dichlorobromopropyl) phosphite, diethyl phosphite, dicyandiamide pyrophosphate, triphenyl phosphite, ammonium dimethyl phosphate, bis(2, 3-dibromopropyl)phosphate, vinylbromide, polypentabromobenzyl acrylate, decabromodiphenyl oxide, pentabromodiphenyl oxide, 2,3-dibromopropanol, octabromodiphenyl oxide, polybrominated dibenzo-p-dioxins, dibenzofurans and bromo-chlorinate paraffins.

The flame-retardant may include a phosphorus-based flame-retardant. Phosphorous-based flame-retardants are compounds that include phosphorous, such as halogenated phosphates (chlorinated phosphates, brominated phosphates and the like), non-halogenated phosphates, triphenyl phosphates, phosphate esters, polyols, phosphonium derivatives, phosphonates, phosphoric acid esters and phosphate esters. Phosphorous-based flame-retardants are usually composed of a phosphate core to which is bonded alkyl (generally straight chain) or aryl (aromatic ring) groups. Halogenated phosphate compounds are often introduced to decrease total halogen concentration. Non-halogenated phosphate compounds include, for example, red phosphorous, inorganic phosphates, insoluble ammonium phosphate, to ammonium polyphosphate, ammonium urea polyphosphate, ammonium orthophosphate, ammonium carbonate phosphate, ammonium urea phosphate, diammonium phosphate, ammonium melamine phosphate, diethylenediamine polyphosphate, dicyandiamide polyphosphate, polyphosphate, urea phosphate, melamine pyrophosphate, melamine orthophosphate, melamine salt of boron-polyphosphate, melamine salt of dimethyl methyl phosphonate, melamine salt of dimethyl hydrogen phosphite, ammonium salt of boron-polyphosphate, urea salt of dimethyl methyl phosphonate, organo-phosphates, phosphonates and phosphine oxide. Phosphate esters include, for example, trialkyl derivatives, such as triethyl phosphate and trioctyl phosphate, triaryl derivatives, such as triphenyl phosphate, and aryl-alkyl derivatives, such as 2-ethylhexyl-diphenyl phosphate.

Other examples of phosphorous-based flame-retardants include methylamine boron-phosphate, cyanuramide phosphate, cresyl diphenyl phosphate, tris(1-chloro-2-propyl) phosphate, tris(2-chloroethyl)phosphate, tris(2,3-dibromopropyl)phosphate, triphenyl phosphate, magnesium phosphate, tricresyl phosphate, hexachlorocyclopentadiene, isopropyl triphenyl phosphate, tricresol phosphate, ethanolamine dimethyl phosphate, cyclic phosphonate ester, monoammonium phosphate and diammonium phosphate, which permit a char formation as a result of esterification of hydroxyl groups with the phosphoric acid, trialkyl phosphates and phosphonates, such as triethyl phosphate and dimethyl, aryl phosphates, such as triaryl phosphates, isopropyl triphenyl phosphate, octylphenyl phosphate, triphenylphosphate, ammonium phosphates, such as ammonium phosphate, ammonium polyphosphate and potassium ammonium phosphate, cyanuramide phosphate, aniline phosphate, trimethylphosphoramide, tris(1-aziridinyl)phosphine oxide, triethylphosphate, bis(5,5-dimethyl-2-thiono-1, 3,2-dioxaphosphorinamyl)oxide, Bis(2-chloroethyl)vinyl phosphate, dimethylphosphono-N-hydroxymethyl-3-propionamide, tris(chloropropyl)phosphate, tris(2-butoxyethyl) phosphate, tris(2-chloroethyl)phosphate, tris(2-ethylhexyl) phosphate, tris(chloropropyl)phosphate, tetrakis (hydroxymethyl)phosphonium salts, such as tetrakis (hydroxymethyl)phosphonium chloride and tetrakis (hydroxymethyl)phosphonium sulfate, n-hydroxymethyl-3-(dimethylphosphono)-propionamide, urea phosphate, melamine pyrophosphate, a melamine salt of boron-polyphosphate, an ammonium salt of boron-polyphosphate, dicyandiamide pyrophosphate, triphenyl phosphite, ammonium dimethyl phosphate, fyroltex HP, melamine orthophosphate, ammonium urea phosphate, ammonium melamine phosphate, a urea salt of dimethyl methyl phosphonate, a melamine salt of dimethyl methyl phosphonate, a melamine salt of dimethyl hydrogen phosphite, polychlorinated biphenyls, a variety of alkyl diaryl phosphates and mixtures of monomeric chloroethyl phosphonates and high boiling phosphonates.

In certain embodiments, the flame-retardant includes one or more metal hydroxide flame-retardants such as inorganic hydroxides, such as aluminum hydroxide, magnesium hydroxide, aluminum trihydroxide (ATH) and hydroxycarbonate. The flame-retardant may include melamine-based flame-retardants which are a family of non-halogenated flame-retardants that include three chemical groups: (a) melamine (2,4,6-triamino-1,3,5 triazine); (b) melamine derivatives (including salts with organic or inorganic acids of melamine, such as boric acid, cyanuric acid, phosphoric acid or pyro/poly-phosphoric acid); and (c) melamine homologues. Melamine derivatives include, for example, trimethyl melamine, melamine cyanurate (a salt of melamine and cyanuric acid), melamine-mono-phosphate (a salt of melamine and phosphoric acid), melamine pyrophosphate and melamine polyphosphate. Melamine homologues include melam ((E)-6-((4,6-diamino-1,3,5-triazin-2(1H)-ylidene) amino)-1,3,5-triazine-2,4-diamine), melem (1,3,3a1,4,6,7,9-heptaazaphenalene-2,5,8-triamine) and melon (poly[1,3, 3a1,4,6,7,9-heptaazaphenalene-2,5,8-triamine]).

The flame-retardant may include one or more borate flame-retardant compounds as well. Borate flame-retardant compounds include zinc borate, borax (sodium borate), ammonium borate, and calcium borate. Zinc borate can be used alone, or in conjunction with other chemical compounds, such as antimony oxide, alumina trihydrate, magnesium hydroxide or red phosphorous. It acts through zinc halide or zinc oxyhalide, which accelerate the decomposition of halogen sources and promote char formation.

Other examples of flame-retardant substances useful with the invention also include boric acid, boron oxide, calcium borate, alumina trihydrate(alumina hydroxide), alumina carbonate, hydrated aluminum, aluminum hydroxide, antimony oxide, antimony trioxide, antimony pentoxide, sodium antimonate, magnesium carbonate, potassium fluorotitanate, potassium fluorozirconate, zinc oxide, hunite-hydromagnesite, ammonium octamolybdate, ammonium bromide, ammonium sulfate, ammonium carbonate, ammonium oxylate, barium metaborate, molybdenum trioxide, zinc hydroxystannate, sodium tungstate, sodium antimonate, sodium stannate, sodium aluminate, sodium silicate, sodium bisulfate, ammonium borate, ammonium iodide, tin compounds, molybdic oxide, sodium antimonate, ammonium sulfamate, ammonium silicate, quaternary ammonium hydroxide, aluminium tryhydroxide, tetrabromobisphenol A, titanium compounds, zirconium compounds, other zinc compounds, such as zinc stannate and zinc hydroxy-stannate, dioxins, diethyl phosphite, methylamine boron-phosphate, cyanoquanidine, thiourea, ethyl urea, dicyandiamide and halogen-free phosphonic acid derivatives.

In one embodiment, flame-retardant substances for use in the processes, systems, compositions and substrates of the present invention include boric acid, sodium borate, decabromodiphenyl ether, hexabromocyclododecane, potassium fluorotitanate, potassium fluorozirconate, ammonium bromide, aluminum hydrate, halogenated compounds (polybrominated diphenyl ethers, chlorinated paraffins and the like), organic phosphates(tri-alkyl phosphates, tri-aryl phosphates, trichioroalkyl phosphates, dialkyl phosphites, tetrakis(hydroxymethyl)phosphonium chloride and the like), ammonium carbonate phosphate, di-ammonium to phosphate, sodium tungstate, pentabromodiphenyl ether, pentabromotoluene, tetrabromophthalic acid diol[2-hydroxypropyl-oxy-2-2-hydroxyethyl-ethyltetrabromophthalate], tetrabromophthalic anhydride, N,N'-ethylene-bis-(tetrabromophthalimide), bromo-chlorinate paraffins, dimethylphosphono-N-hydroxymethyl-3-propionamide, cyclic phosphonate ester, dimethyl-3-(hydroxymethyl-amino)-3-oxopropyl phosphonate, Bis(5,5-dimethyl-2-thiono-1,3,2-dioxaphosphorinamyl)oxide, Bis(2-chloroethyl)vinyl phosphate, sodium stannate, sodium aluminate, sodium silicate, sodium bisulfate, ammonium borate, ammonium polyphosphate, ammonium iodide, dibromopropylacrylate, tetrabromodipenta-erythritol, pentabromoethylbenzene, tris(2,3-dibromopropyl)phosphate, tris (dichloropropyl)phosphite, bis-(2,3-dibromo-1-propyl) phthalate, trimethylphosphoramide, tris(1-aziridinyl) phosphine oxide, bis[bis(2-chloroethoxy)-phosphinyflisopropylchloro-ethyl phosphate, tris (dichloropropyl)phosphite, tris-(2-chloroethyl)-phosphite, polybrominated diphenyl ethers, intumescent chemicals, alumina trihydrate, brominated aromatic organic compounds, and brominated cycloaliphatic organic compounds.

In another embodiment, flame-retardant substances for use in the processes, systems, compositions and substrates of the invention are phosphoric acid, halogen-free phosphoric acid derivatives (such as ammonium polyphosphate or tri-arylphosphate esters), phosphonic acid, halogen-free phosphonic acid derivatives (such as 3-(dimethylphosphono) proprionic acid methyl amide), ammonia, ammonia phosphate, ammonium molybdate, ammonium borate, organophosphorus chemicals (such as triethyl or trioctyl phosphate, triaryl derivatives, including triphenyl phosphate, and aryl-alkyl derivatives, such as 2-ethylhexyldiphenyl phosphate), melamine, melamine chemicals (such as cyanurotriamide, cyanotriamine, melamine cyanurate, melamine borate, melamine pyrophosphate, melamine polyphosphate or isomelamine), melamine derivatives (such as trimethyl melamine), intumescent chemicals, alumina trihydrate, urea, guanidine, dicyandiamide, ethyl urea, ethylamine, thiourea, diethylenediamine, ethylenediamine, brominated aromatic organic compounds (such as tetrabromobisphenol or decabromodiphenyl ether), brominated cycloaliphatic organic compounds (such as hexabromocyclododecane) and various mixtures thereof.

The manner in which the flame-retardant composition is applied to the fabric substrate can vary. In one embodiment, for instance, the flame-retardant composition can be printed or sprayed onto a substrate. The flame-retardant can be padded onto the fabric substrate, in some embodiments. The flame-retardant coating layer can be applied to the fabric substrate as a fluid having a viscosity ranging from 10,000 to 50,000 cps. In the case of relatively light weight fabrics (e.g., having a basis weight less than 200 g/m$^2$) it is generally desirable for the fluid from which the flame-retardant coating layer is formed to have a viscosity ranging from 10,000 to 15,000 cps. For heavier weight fabrics it may be desirable for the fluid to have a viscosity greater than 15,000 cps, such as viscosity in excess of 20,000 cps. Suitable solvents that can be used in the practice of the invention include toluene, xylene, isopropyl alcohol (IPA), methyl ethyl ketone (MEK), and dimethylformamide (DMF).

The flame-retardant coating layer may comprise a polymeric coating, preferably a polyurethane coating, of sufficient thickness to impart water resistance or inhibit water migration through the fabric composite. The polyurethane may be a hydrophilic or hydrophobic polyurethane polymer. The flame-retardant coating layer may range from 0.2 oz/yd$^2$ to 5 oz/yd$^2$ and may be applied to the fabric substrate as a single coat or as two or more coatings. The flame-retardant layer may comprise an intrinsically flame-retardant polyurethane, by which is meant a polyurethane polymer that comprises one or more monomers bearing halogen (e.g., bromine, etc.), phosphorus, or other atoms or species that impart flame resistance. In addition, to the intrinsically flame-retardant polymer, one or more flame-retardant additives may be included in the flame-retardant layer. Any flame-retardants listed herein are considered useful in the flame-retardant coating layer. For example, the layer may include flame-retardant additives such as organic and inorganic flame-retardant additives. In particular embodiments, flame-retardant coating and/or adhesive layers may comprise one or more brominated flame-retardants (e.g., decadibromophenyl ethane, ethylene-bis tetrabromophthalimide, etc.) and/or one or more antimony based flame-retardants (e.g., antimony trioxide, antimony pentaoxide, etc.) and/or one or more metal hydroxide flame-retardants (e.g., aluminum hydroxide, etc.), and/or one or more melamine type flame-retardants (e.g., trimethyl melamine, etc.). In some embodiments, the flame-retardant polymer layer comprises one or more brominated flame-retardants (e.g., decadibromophenyl ethane, ethylene-bis tetrabromophthalimide, etc.). In some embodiments, the flame-retardant polymer layer comprises one or more antimony based flame-retardants (e.g., antimony trioxide, antimony pentaoxide, etc.). In some embodiments, the flame-retardant polymer layer comprises one or more metal hydroxide flame-retardants (e.g., aluminum hydroxide, etc.). In certain implementations, the flame retardant polymer comprises one or more melamine flame-retardants or derivatives thereof (e.g., trimethyl melamine, etc.) The collective weight of all such additional flame-retardant additives may be from 15% to 70% of the dry weight of the flame-retardant polymer layer (e.g., from 20% to 60% or from 35% to 55% or from 25% to 55% or from 35% to 50% of the dry weight of the flame-retardant polymer layer, etc.). In some embodiments, the collective weight of all inorganic or organic flame-retardant additives is from 5% to 70% of the dry weight of the flame-retardant polymer layer (e.g., from 10% to 60% or from 20% to 50% or from 25% to 45% or from 30% to 55% or from 35% to 50% of the dry weight of the flame-retardant polymer layer, etc.). In some embodiments, collective weight of the brominated flame-retardant additives (e.g., decadibromophenyl ethane, ethylene-bis tetrabromophthalimide, etc.) is from 10% to 40% (e.g., from 15% to 35%, from 20% to 30%, etc.) of the dry weight of the flame-retardant polymer layer. In some embodiments, collective weight of the antimony-based flame-retardant additives (e.g., antimony trioxide, antimony pentaoxide, etc.) is from 0.1% to 15% (e.g., from 0.5% to 10%, from 1% to 7%, etc.) of the dry weight of the flame-retardant polymer layer. In some embodiments, collective weight of the metal hydroxide flame-retardant additives (e.g., aluminum hydroxide, etc.) is from 0.1% to 15% (e.g., from 1% to 10%, from 5% to 10%, etc.) of the dry weight of the flame-retardant polymer layer. In some embodiments, collective weight of the melamine flame-retardant additives or derivatives thereof (e.g., trimethylmelamine, etc.) is from 0.1% to 15% (e.g., from 0.5% to 5%, from 1% to 3%, etc.) of the dry weight of the flame-retardant polymer layer. In one embodiment, the flame-retardant additives are included in an amount sufficient such that the coated fabric passes ASTM D6413 flame-retardant protocols (e.g., the coated fabric has a char length of less than 4.5 inches on the warp and/or filling, the coated fabric has less than 6 or less than 5 or less than 4 or less than 3 or less than 2 or less than 1 or no drips, the coated fabric has less than 3 second after glow, or less than 3 seconds after flame, etc.).

In one particular embodiment, the flame-retardant coating layer comprises from 30 to 80 wt. % polyurethane in solvent, 20 to 25 wt. % of flame-retardant (e.g., decabromodiphenyl ethylene, ethyl-bis-tetrabromophthalimide, or combinations thereof), 1 to 4 wt. % antimony trioxide; and 4 to 6 wt. % aluminum hydroxide, based on the total weight of the dried coating. In some embodiments, the flame-retardant coating composition which may be spread on the fabric and heated to form the flame-retardant coating with solvent removed, may comprise 35-40% halogenated polyurethane by weight of the composition, 15-20% halogenated flame-retardant, 1-4% antimony based flame-retardant (e.g., antimony trioxide, antimony pentaoxide, etc.), 4-5% aluminum hydroxide, and 1-2% trimethyl melamine.

The flame-retardant coating layer can be prepared by mixing the halogenated polyurethane, brominated flame-retardant, antimony based flame-retardants, metal hydroxide components, and solvent in a mix tank to produce a coating material having a desired viscosity. The flame-retardant layer may then be applied to the surface of the fabric substrate. In one embodiment, the flame-retardant coating layer is applied by via a knife blade over a table coater. The coating composition may be applied as a single coating or in multiple coatings. For example, in some embodiments, the flame-retardant coating composition is applied to a surface of the fabric which is then heated. Optionally, one or more additional applications of the coating composition may then be applied onto the dried coating to form the flame-retardant polymer layer. The flame-retardant layer may be applied before or after the fluid saturant has been applied to the fabric substrate. In certain embodiments, the fluid saturant is applied to the fabric composite following assembly with unimpregnated fabrics.

Generally, the thickness of the flame-retardant coating layer ranges from 0.5 to 3 mils, and in particular, from 1 to 2 mils. In certain implementations, the flame-retardant coating layer is applied to the fabric at a minimum basis weight of 10 g/m$^2$, and more desirably, from 13 to 101 g/m$^2$ (0.4 to 3.0 oz/yd$^2$ dry weight). In one embodiment, the polyurethane coating has a basis weight ranging from 50 to 100 g/m$^2$.

In certain implementations, the flame-retardant polymer layer is applied towards the interior of the fabric composite on the fabric to prevent abrasion and loss of flame-retardant polymer coating. This configuration may extend the flame-retardant effect over wear and/or washing. The configuration may also provide the fabric with a more desirable hand (e.g., less rubbery, etc.).

Liquid Bath for Impregnation of Fabric

Each fabric substrate may be impregnated with one or more flame-retardants as well. To do so, the composite fabric may be dipped in a finishing bath comprising various flame-retardants following assembly of the thermoplastic and fabric layers adhesively attached to one another. For example, the finishing bath may include both a flame-retardant oligomer and a water and oil repellant compound. In some embodiments, this finishing bath composition (e.g., flame-retardant oligomer with water and oil repellant compounds, etc.) is applied to the composite fabric as a finish coating or fluid saturant. The fluid saturant may be applied to the fabric substrate as a fluid that impregnates the fabric substrate and coats the surfaces of the fibers. Suitable flame-retardant oligomers that can be used in the practice of the invention include thiourea-formaldehyde and organophosphate oligomers. An exemplary organophosphate that can be used in the practice of the invention is a phosphate ester blend that is available from Manufacturers Chemicals LP under the tradename Fire Retard 66. The finishing bath composition (and therefore compounds which impregnate the composite fabric) include hydrophobic and oleophobic compounds such as fluorochemicals, polysiloxanes and the like. Fluoroalkyl acrylate copolymer is an exemplary fluorochemical that can be used in the practice of the invention.

In some embodiments, the fluid saturant includes an organic catalyst, such as para-toluene sulfonic acid. The organic catalyst may react with the thiourea-formaldehyde adduct in the finish to form a thiourea aminoplast. The thiourea aminoplast is relatively insoluble and helps to improve the durability of the flame-resistant properties of the composite fabric.

The composition comprising the flame-retardant oligomer and a water and oil repellant compound can be applied to the fabric substrate by immersion coating, spraying, foam application, kiss-coat, and the like. In one particular embodiment, the composition can be applied by passing the composite fabric substrate through a bath of the composition for a time sufficient for the composition to substantially impregnate the fabric substrate. The amount of the flame-retardant oligomer in the bath is typically from 5 to 50 wt. %, and more typically from 15 to 30 wt. %. The amount of the water and oil repellant compound in the aqueous bath is typically from 0.75 to 5 wt. % (e.g., from 1.5 to 3 wt. %, etc.).

In certain embodiments, the finishing bath composition comprises thiourea-formaldehyde condensate, and fluoroacrylate and alkylacrylate copolymers. For example, the composition may comprise from 20% to 40% thiourea-formaldehyde condensate by weight of the composition (e.g., 25%-35% thiourea formaldehyde condensate, etc.) and/or from 2% to 10% (e.g., 5%-7%, etc.) fluoroacrylate and alkylacrylate copolymers by weight of the composition. The finishing bath may be aqueous. These finishing baths may be used to impregnate certain components (such as thiourea formaldehyde and/or fluoroacrylate and alkylacrylate copolymers) into the fabric portion of the composite fabric. In some embodiments, the finishing bath comprises fluorinated hexamethyl polyacrylate. Various finishing baths are described in U.S. Pat. No. 7,666,802, hereby incorporated by reference in its entirety and specifically in relation to compositions and methods for impregnation of fabrics and flame-retardant coatings on fabrics.

Generally, the amount of the finishing bath composition (e.g., containing the flame-retardant oligomer and/or water and oil repellant compound, etc.) that is applied to the fabric substrate is from 20 to 50 wt. %, based on the total weight of the composite fabric, and in particular from 20 to 40 wt. %, and more particularly, from 25 to 30 wt. %, based on the total weight of the composite fabric. Desirably, the fluid saturant is added to the fabric substrate at a weight of 0.05-1 ounces per square yard of material.

Once the fabric portion of the composite fabric has been impregnated with certain components of the finishing bath, the fabric may then be heated to form a layer of the composition onto the surface of the fibers. In some embodiments, the impregnated composite fabric may be passed through an oven at a temperature from 150° to 400° F. at a speed that typically ranges from 1 to 50 yards per minute.

In further embodiments, the fabric substrate may be impregnated with a nanoparticle based fluid saturant. The fluid saturant finishing bath composition may comprise from 2 to 10 wt. % of a fluoroalkyl acrylate copolymer and/or 3 to 8 wt. % of an amorphous silica having an average particle size of 20 to 60 nm and/or 1 to 3 wt. % tripropylene glycol; and balance water. In certain embodiments, the fluid saturant finishing bath has the following composition: 5-10 wt. % fluoroacrylate and alkylacrylate copolymers; optionally 5 wt. % amorphous silica particles having an average particle size of 40 nm; 1.7 wt. % Tripropylene glycol; and 89 wt. % water. The nanoparticle based fluid saturant may help to further reduce the flammability of the fabric by reducing the overall amount of organics that are present in the fabric.

Characterizations of Fabric Composites

Various standards for measurement of the flame-retardant fabric composite are provided herein, each of which are incorporated by reference in their entirety. These measurements may be used to characterize the flame-retardant fabric composite. For example, the flame retardancy may be measured by ASTM D751 and/or ASTM D6413/D6413M and/or ASTM F1891 and/or ASTM F2733 and/or ASTM F 1930-00, the breaking strength may be measured by ASTM D5034, the dimensional stability (of the warp or the filling) may be measured by AATCC 96, the abrasion resistance may be measured by ASTM D3884, the water resistance may be measured by AATCC 127 or ASTM D751, the water repellency (initially or laundered) may be measured by AATCC70, and the oil repellency (initially or laundered) may be measured by AATCC 118, the breaking strength may be measured with ASTM D5034, and the tearing strength (of the warp or the filling) may be measured by ASTM D2261. Various combinations of fabrics, thermoplastic polyurethanes, coatings and finishing baths may result in specific properties of the fabric composite. For example, the fabric composite may be characterized by one or more (e.g., two, three, four, five, six, seven, eight, etc.) of or all:

(a) a breaking strength (warp), as measured by ASTM D5034, of less than 500 lbs. force (e.g., less than 360 lbs. force, less than 300 lbs. force, etc.);
(b) a breaking strength (filling), as measured by ASTM D5034, of less than 500 lbs. force (e.g., less than 360 lbs. force, less than 300 lbs. force, etc.);
(c) a dimensional stability (warp), as measured by AATCC 96, of less than 3% average maximum (e.g., less than 2.5% average maximum, etc.);
(d) a dimensional stability (filling), as measured by AATCC 96, of less than 3% average maximum (e.g., less than 2.5% average maximum, etc.);
(e) an abrasion resistance, as measured by ASTM D3884, of more than 800 cycles;
(f) a water resistance, as measured by AATCC 127, of no leakage below 35 cm;
(g) an oil repellency, as measured by AATC 118, of lack of wetting of N-tetradecane;
(h) an after flame (initial), as measured by ASTM D6413, of less than 3 seconds (e.g., less than 2.5 seconds, less than 2 seconds, etc.);
(i) an after flame (after five washings), as measured by ASTM D6413, of less than 3 seconds (e.g., less than 2.5 seconds, less than 2 seconds, etc.);
(j) an after glow (initial), as measured by ASTM D6413, of less than 2 seconds (e.g., less than 1.5 second, less than 1 second, etc.);
(k) an after glow (after five washings), as measured by ASTM D6413, of less than 2 seconds (e.g., less than 1.5 second, less than 1 second, etc.);
(l) a melt drip (initial), as measured by ASTM D6413, of less than 6 droplets (e.g., less than 5 droplets, less than 4 droplets, less than 3 droplets, less than 2 droplets, less than 1 droplet, no droplets);
(m) a melt drip (after five washings), as measured by ASTM D6413, of less than 6 droplets (e.g., less than 5 droplets, less than 4 droplets, less than 3 droplets, less than 2 droplets, less than 1 droplet, no droplets);
(n) a char length (initial), as measured by ASTM D6413, of less than 4.5 inches (e.g., less than 4 inches, less than 3.5 inches, less than 3 inches, less than 2.5 inches, etc.); or
(o) a char length (after five washings), as measured by ASTM D6413, of less than 4.5 inches (e.g., less than 4 inches, less than 3.5 inches, less than 3 inches, less than 2.5 inches, etc.);
(p) a tearing strength (warp), as measured by ASTM D2261, of more than 35 lbs. force (e.g., more than 40 lbs. force, more than 45 lbs. force, etc.);
(q) a tearing strength (filling), as measured by ASTM D2261, of more than 30 lbs. force (e.g., more than 35 lbs. force, more than 40 lbs. force, more than 45 lbs. force, etc.);
(r) a breaking strength (warp), as measured by ASTM D5034, of more than 400 lbs. force (e.g., more than 450 lbs. force, more than 500 lbs. force, etc.); and
(s) a breaking strength (filling), as measured by ASTM D5034, of more than 300 lbs. force (e.g., more than 325 lbs. force, more than 350 lbs. force, more than 400 lbs. force, etc.).

In some embodiments, the flame-retardant fabric composite may have a breaking strength (warp), as measured by ASTM D5034, of less than 360 lbs. force (e.g., less than 300 lbs. force, etc.). In some embodiments, the flame-retardant fabric composite may have a breaking strength (filling), as measured by ASTM D5034, of less than 360 lbs. force (e.g., less than 300 lbs. force, etc.). In some embodiments, the flame-retardant fabric composite may have a dimensional stability (warp), as measured by AATCC 96, of less than 3% average maximum (e.g., less than 2.5% average maximum, etc.). In some embodiments, the flame-retardant fabric composite may have a dimensional stability (filling), as measured by AATCC 96, of less than 3% average maximum (e.g., less than 2.5% average maximum, etc.). In some embodiments, the flame-retardant fabric composite may have an abrasion resistance, as measured by ASTM D3884, of more than 800 cycles. In some embodiments, the flame-retardant fabric composite may have a water resistance, as measured by AATCC 127, of no leakage below 35 cm. In some embodiments, the flame-retardant fabric composite may have an oil repellency, as measured by AATC 118, of lack of wetting of N-tetradecane. In some embodiments, the flame-retardant fabric composite may have an after flame (initial), as measured by ASTM D6413, of less than 3 seconds (e.g., less than 2.5 seconds, less than 2 seconds, etc.). In some embodiments, the flame-retardant fabric composite may have an after flame (after five washings), as measured by ASTM D6413, of less than 3 seconds (e.g., less than 2.5 seconds, less than 2 seconds, etc.). In some embodiments, the flame-retardant fabric composite may have an after glow (initial), as measured by ASTM D6413, of less than 2 seconds (e.g., less than 1.5 second, less than 1 second, etc.). In some embodiments, the flame-retardant fabric composite may have an after glow (after five washings), as measured by ASTM D6413, of less than 2 seconds (e.g., less than 1.5 second, less than 1 second, etc.). In some embodiments, the flame-retardant fabric composite may have a melt drip (initial), as measured by ASTM D6413, of less than 6 droplets (e.g., less than 5 droplets, less than 4 droplets, less than 3 droplets, less than 2 droplets, less than 1 droplet, no droplets). In some embodiments, the flame-retardant fabric composite may have a melt drip (after five washings), as measured by ASTM D6413, of less than 6 droplets (e.g., less than 5 droplets, less than 4 droplets, less than 3 droplets, less than 2 droplets, less than 1 droplet, no droplets). In some embodiments, the flame-retardant fabric composite may have a char length (initial), as measured by ASTM D6413, of less than 4.5 inches (e.g., less than 4 inches, less than 3.5 inches, less than 3 inches, less than 2.5 inches, etc.). In some embodiments, the flame-retardant fabric composite may have a char length (after five washings), as measured by ASTM D6413, of less than 4.5 inches (e.g., less than 4 inches, less than 3.5 inches, less than 3 inches, less than 2.5 inches, etc.). In some embodiments, the flame-retardant fabric composite may have a tearing strength (warp), as measured by ASTM D2261, of more than 35 lbs. force (e.g., more than 40 lbs. force, more than 45 lbs. force, etc.). In some embodiments, the flame-retardant fabric composite may have a tearing strength (filling), as measured by ASTM D2261, of more than 30 lbs. force (e.g., more than 35 lbs. force, more than 40 lbs. force, more than 45 lbs. force, etc.).

In various implementations, the flame-retardant fabric composite may be characterized by an after flame (initial), as measured by ASTM D6413, of less than 3 seconds (e.g., less than 2.5 seconds, less than 2 seconds, etc.) and a tearing strength, as measured by ASTM D2261, of more than 35 lbs. force (e.g., more than 40 lbs. force, more than 45 lbs. force, etc.) for the warp and/or more than 30 lbs. force (e.g., more than 35 lbs. force, more than 40 lbs. force, more than 45 lbs. force, etc.) for the filling. In another implementation, the flame-retardant fabric composite may be characterized by an after flame (after five washings), as measured by ASTM D6413, of less than 3 seconds (e.g., less than 2.5 seconds, less than 2 seconds, etc.) and a tearing strength, as measured by ASTM D2261, of more than 35 lbs. force (e.g., more than 40 lbs. force, more than 45 lbs. force, etc.) for the warp and/or more than 30 lbs. force (e.g., more than 35 lbs. force, more than 40 lbs. force, more than 45 lbs. force, etc.) for the filling. In another embodiment, the flame-retardant fabric composite may be characterized by an after glow (initial), as measured by ASTM D6413, of less than 2 seconds (e.g., less than 1.5 second, less than 1 second, etc.) and a tearing strength, as measured by ASTM D2261, of more than 35 lbs. force (e.g., more than 40 lbs. force, more than 45 lbs. force, etc.) for the warp and/or more than 30 lbs. force (e.g., more than 35 lbs. force, more than 40 lbs. force, more than 45 lbs. force, etc.) for the filling. In another embodiment, the flame-retardant fabric composite may be characterized by an after glow (after five washings), as measured by ASTM D6413, of less than 2 seconds (e.g., less than 1.5 second, less than 1 second, etc.) and a tearing strength, as measured by ASTM D2261, of more than 35 lbs. force (e.g., more than 40 lbs. force, more than 45 lbs. force, etc.) for the warp and/or more than 30 lbs. force (e.g., more than 35 lbs. force, more than 40 lbs. force, more than 45 lbs. force, etc.) for the filling. In various embodiments, the flame-retardant fabric composite may be characterized by a melt drip (initial), as measured by ASTM D6413, of less than 6 droplets (e.g., less than 5 droplets, less than 4 droplets, less than 3 droplets, less than 2 droplets, less than 1 droplet, no droplets) and a tearing strength, as measured by ASTM D2261, of more than 35 lbs. force (e.g., more than 40 lbs. force, more than 45 lbs. force, etc.) for the warp and/or more than 30 lbs. force (e.g., more than 35 lbs. force, more than 40 lbs. force, more than 45 lbs. force, etc.) for the filling. In certain embodiments, the flame-retardant fabric composite may be characterized by a melt drip (after five washings), as measured by ASTM D6413, of less than 6 droplets (e.g., less than 5 droplets, less than 4 droplets, less than 3 droplets, less than 2 droplets, less than 1 droplet, no droplets) and a tearing strength, as measured by ASTM D2261, of more than 35 lbs. force (e.g., more than 40 lbs. force, more than 45 lbs. force, etc.) for the warp and/or more than 30 lbs. force (e.g., more than 35 lbs. force, more than 40 lbs. force, more than 45 lbs. force, etc.) for the filling. In various embodiments, the flame-retardant fabric composite may be characterized by a char length (initial), as measured by ASTM D6413, of less than 4.5 inches (e.g., less than 4 inches, less than 3.5 inches, less than 3 inches, less than 2.5 inches, etc.) and a tearing strength, as measured by ASTM D2261, of more than 35 lbs. force (e.g., more than 40 lbs. force, more than 45 lbs. force, etc.) for the warp and/or more than 30 lbs. force (e.g., more than 35 lbs. force, more than 40 lbs. force, more than 45 lbs. force, etc.) for the filling. In various embodiments, the flame-retardant fabric composite may be characterized by a char length (after five washings), as measured by ASTM D6413, of less than 4.5 inches (e.g., less than 4 inches, less than 3.5 inches, less than 3 inches, less than 2.5 inches, etc.) and a tearing strength, as measured by ASTM D2261, of more than 35 lbs. force (e.g., more than 40 lbs. force, more than 45 lbs. force, etc.) for the warp and/or more than 30 lbs. force (e.g., more than 35 lbs. force, more than 40 lbs. force, more than 45 lbs. force, etc.) for the filling. In accordance with the foregoing, fabrics also characterized by characterizations (a)-(g) above are also embraced by the invention.

In various embodiments, the flame-retardant fabric composite may be characterized by an after flame (initial) of less than 3 seconds (e.g., less than 2.5 seconds, less than 2 seconds, etc.), an after glow (initial) of less than 2 seconds (e.g., less than 1.5 second, less than 1 second, etc.), a melt drip (initial) of less than 6 droplets (e.g., less than 5 droplets, less than 4 droplets, less than 3 droplets, less than 2 droplets, less than 1 droplet, no droplets), a char length (initial) of less than 4.5 inches (e.g., less than 4 inches, less than 3.5 inches, less than 3 inches, less than 2.5 inches, etc.), as measured by ASTM D6413, and a tearing strength, as measured by ASTM D2261, of more than 35 lbs. force (e.g., more than 40 lbs. force, more than 45 lbs. force, etc.) for the warp and/or more than 30 lbs. force (e.g., more than 35 lbs. force, more than 40 lbs. force, more than 45 lbs. force, etc.) for the filling.

In some implementations, the flame-retardant fabric composite may be characterized by an after flame (after five washings) of less than 3 seconds (e.g., less than 2.5 seconds, less than 2 seconds, etc.), an after glow (after five washings) of less than 2 seconds (e.g., less than 1.5 second, less than 1 second, etc.), a melt drip (after five washings) of less than 6 droplets (e.g., less than 5 droplets, less than 4 droplets, less than 3 droplets, less than 2 droplets, less than 1 droplet, no droplets), a char length (after five washings) of less than 4.5 inches (e.g., less than 4 inches, less than 3.5 inches, less than 3 inches, less than 2.5 inches, etc.), as measured by ASTM D6413, and a tearing strength, as measured by ASTM D2261, of more than 35 lbs. force (e.g., more than 40 lbs. force, more than 45 lbs. force, etc.) for the warp and/or more than 30 lbs. force (e.g., more than 35 lbs. force, more than 40 lbs. force, more than 45 lbs. force, etc.) for the filling.

Flammability of the fabrics of the present invention was tested according to ASTM D6413 Standard Test Method for Flame Resistance of Textiles (Vertical Test). In some embodiments, the flame-retardant fabric composite may be characterized by an ASTM D6413 Vertical Flame Test of (1) less than a 3 second after-flame, (2) less than 2 second after-glow, and (3) less than 4.5 inch char length. In certain implementations, the flame-retardant fabric composite may be characterized by less than 5 or less than 3 or an absence of drips in the ASTM D6413 Vertical Flame Test. In certain embodiments, the flame-retardant fabric composite may be characterized by an ASTM D6413 Vertical Flame Test of (1) less than a 3 second after-flame, (2) less than 2 second after-glow, and (3) less than 4.5 inch char length after 5 washings. In certain implementations, the flame-retardant fabric composite may be characterized by less than 5 or less than 3 or an absence of drips in the ASTM D6413 Vertical Flame Test after five washings of the flame-retardant fabric composite.

Manufacture of Composites

Numerical modifiers such as "first" and "second" are intended to identify and differentiate specific components of the composites, compositions, layers, and fabrics described herein. Such modifiers do not indicate a numerical order to such components. For example, a first coating is not necessarily applied before a second coating. However, it will also be understood that these numeric identifiers may identify the same or similar components. For example, a first coating may be compositionally the same as (or substantially similar) to a second coating. In some embodiments, the fabric composite is symmetric, such that the first and second nylon fabrics, the first and second flame-retardant polymer layers, and the first and second adhesive layers are the same. The numeric identifiers may be used to identify a section of the composite material. For example, a first nylon fabric is coated with a first flame-retardant polyurethane polymer layer, the first flame-retardant polyurethane polymer layer is coated with the first adhesive layer, and so forth. These components may be laminated to be produce a first TPU layered nylon fabric. Similarly, a second nylon fabric may be coated with a second flame-retardant polyurethane polymer layer, the second flame-retardant polymer layer may be coated with a second adhesive layer, and so forth.

The flame-retardant fabric composites may be manufactured by:

providing a woven nylon fabric sheet having a layer of flame-retardant polyurethane polymer on one face thereof, applying a layer of polyurethane (e.g., thermoset polyurethane, thermoplastic polyurethane, etc.) adhesive onto the layer of flame-retardant polyurethane polymer; and adhering a thermoplastic polyurethane film to the adhesive layer, to thereby form a TPU layered nylon fabric. In some embodiments, the first woven nylon fabric sheet has a thiourea formaldehyde flame-retardant and/or a fluorinated durable water repellant (DWR) such as fluorinated hexamethyl polyacrylate impregnated therein. The flame-retardant polyurethane polymer layer may comprise (1) an intrinsically flame-retardant thermoset polyurethane polymer comprising one or more halogenated monomers, and (2) a flame-retardant additive comprising one or more of brominated flame-retardant, antimony trioxide, aluminum hydroxide, or melamine or a derivative thereof. In certain embodiments, the method further comprises the step of laminating the TPU layered nylon fabric to a second sheet of the TPU layered nylon fabric by fusing together, interfacially, the thermoplastic polyurethane (TPU) films of the TPU layered nylon fabrics.

In some embodiments, the method further comprises the step of impregnating the first woven nylon fabric sheet with a thiourea formaldehyde flame-retardant and/or a fluorinated durable water repellant impregnated therein by contacting the laminated fabric with a liquid bath composition comprising a thiourea formaldehyde flame-retardant and/or a fluorinated durable water repellant. In some embodiments, the method may further comprise the step of impregnating the woven nylon fabric sheets of the flame-retardant fabric composite with a thiourea formaldehyde flame-retardant and/or a fluorinated durable water repellant impregnated therein by contacting the first and/or second nylon fabrics of the fabric flame-retardant fabric composite with a liquid bath composition comprising a thiourea formaldehyde flame-retardant and/or a fluorinated durable water repellant. For example, the method may comprise the steps of:

(a) impregnating a woven fabric with a flame retardant composition (e.g., a liquid bath solution such as those described herein including those of Table 1, etc.) to form an impregnated woven fabric;

(b) applying a flame retardant polyurethane solution (e.g., Composition A of Table 1, etc.) onto the impregnated woven to form a flame retardant coating layer on the impregnated woven fabric;

(c) applying an adhesive layer (e.g., Composition B of Table 1, etc.) over the coating layer; adhering a thermoplastic polyurethane (TPU) film to the adhesive layer; and (d) laminating TPU layered fabric to a fabric comprising an exposed TPU layer by fusing together, interfacially, the thermoplastic polyurethane films to form a composite fabric.

In some embodiments, the fabric comprising an exposed TPU layer may be formed by one or more (e.g., two, three, etc.) of steps (a)-(c). In some embodiments, the method further comprises the step of drying the flame retardant coating layer (but not necessarily curing) before application of the coating layer. In some embodiments, the method further comprises the step of heating the composite fabric. Heating the composite fabric may cause a curing of the impregnated flame retardant composition impregnated in the woven fabric and/or curing the flame retardant polyurethane solution coating and/or increasing the interfacial fusion between adjacent layers (e.g., between the flame retardant coating layer and the impregnated woven fabric, between the flame retardant coating layer and the adhesive layer, between the adhesive layer and the TPU layer, between the two TPU layers, etc.). Exemplary temperature ranges for any heating step disclosed herein include those of more than 100° F. (e.g., 100° F. to 200° F., 100° F. to 800° F., 100° F. to 1000° F., etc.) or more than 150° F. (e.g., 150° F. to 600° F., etc.) or more than 200° F. (e.g., 200° F. to 300° F., etc.). In some embodiments, the heating may occur for a period of up to ten minutes (e.g., up to one minute, up to two minutes, up to three minutes, up to four minutes, up to five minutes).

The method for manufacturing a flame-retardant fabric composite may comprise:

providing a first woven nylon fabric sheet having a first layer of flame-retardant polyurethane polymer on one face thereof, applying a first layer of polyurethane (e.g., thermoset polyurethane, thermoplastic polyurethane, etc.) adhesive onto the first layer of flame-retardant polyurethane polymer;

adhering a first thermoplastic polyurethane (TPU) film to the adhesive layer, providing a second woven nylon fabric sheet having a second layer of flame-retardant polyurethane polymer on one face thereof, applying a second layer of polyurethane (e.g., thermoset polyurethane, thermoplastic polyurethane, etc.) adhesive onto the second layer of flame-retardant polyurethane polymer;

adhering a second thermoplastic polyurethane film to the adhesive layer, and laminating the first sheet of the TPU layered nylon fabric to the second sheet of the TPU layered nylon fabric by fusing together, interfacially (e.g., fusing the faces of each TPU film to one another), the first and second thermoplastic polyurethane films.

In certain implementations, the method for manufacturing a flame-retardant fabric composite may comprise:

applying a first coating of flame-retardant polyurethane polymer to one face of a first woven nylon fabric, applying a first layer of polyurethane (e.g., thermoset polyurethane, thermoplastic polyurethane, etc.) adhesive onto the first coating of flame-retardant polyurethane polymer;

adhering a first thermoplastic polyurethane (TPU) film to the adhesive layer to make a first film-coated fabric, applying a second coating of flame-retardant polyurethane polymer on one face of a second woven nylon fabric, applying a second layer of polyurethane (e.g., thermoset polyurethane, thermoplastic polyurethane, etc.) adhesive onto the second coating of flame-retardant polyurethane polymer;

adhering a second thermoplastic polyurethane (TPU) film to the adhesive layer to make a second TPU layered nylon fabric, and laminating the first and second TPU layered nylon fabrics together, interfacially, by fusing the first and second thermoplastic polyurethane films.

The coatings on the fabric (e.g., the flame-retardant polyurethane layer, the adhesive layer) may be applied according to known techniques to the textile fabric substrates. These include spraying, gravure coating, bar coating, coating by knife-over-roller, coating by knife-over-air, padding and screen-printing. It is preferred that the composition is applied by a knife-over-air or knife-over-roller coating method. The compositions may be applied to a coat-weight prior to curing of at least 0.1 oz/yd$^2$ (e.g., greater than 0.5 oz/yd$^2$, from 0.1 to 4.0 oz/yd$^2$, etc.). The flame-retardant polyurethane coating, for example may have a total dried weight from 0.1 to 5 oz/yd$^2$ (e.g., from 1 to 3 oz/yd$^2$, etc.). The adhesive coating may have a total dried weight of greater than 0.01 oz/yd$^2$ (e.g., greater than 0.1 oz/yd$^2$, from 0.1 to 1 oz/yd$^2$, from 0.01 to 1 oz/yd$^2$, etc.). In some embodiments, each coating has a dry weight greater than 0.1 oz/yd$^2$ (e.g., greater than 2 oz/yd$^2$, greater than 3 oz/yd$^2$, from 3.5 oz/yd$^2$ to 4.5 oz/yd$^2$, etc.). The viscosity of the composition may be less than 100,000 cps (e.g., less than 50,000 cps, less than 35,000 cps, less than 10,000 cps, from 1,500 cps to 4,000 cps, from 1,000 cps to 4,500 cps, from 1,500 cps to 3,000 cps, from 20,000 cps to 30,000 cps, etc.). The viscosity may be measured at room temperature using a Brookfield viscometer at 12 rpm. In some embodiments, the viscosity of the coating composition (e.g., 200 mL of the coating composition, etc.) may be measured with a Brookfield Model DLV viscometer at 12 rpm using spindle #4 (guard leg omitted). Measurements may be taken after brief hand stirring and five spindle rotations.

In some embodiments, the textile fabric is scoured prior to application, in order to ensure good adhesion of the composition. In other embodiments, the fabric is not scoured, and the coated composition is attached to the fabric via an adhesive layer therebetween.

It is possible to apply one or more compositions in multiple layers, which together fulfill the preferred criteria set out above. A composition may be layered onto a surface and heated. Additional composition may be applied to the exposed layer and heated again. This process may be repeated one or more times to achieve a desired dry weight for the layer. It is also possible to apply onto the coating composition a further coating, e.g. of a material providing low friction, or an additional textile fabric, whether woven or non-woven to improve the strength and/or the feel of the fabric.

The lamination of the TPU layer may occur by adhesive attachment of a thermoplastic polyurethane to the fabric (or coated fabric). Similar techniques may be employed for the lamination of TPU layered nylon fabrics wherein the laminate is brought adjacent to the surface to be laminated and the two are compressed together (e.g., with nip rollers). In certain embodiments, the lamination occurs under heat as well (e.g., by heating a roller to a temperature greater than 300° F. or greater than 400° F. or a temperature from 300° F. to 1000° F. or a temperature from 400° F. to 1000° F., etc.). During lamination, TPU layered nylon fabrics may be pre-heated. In some embodiments, the nylon-fabrics are preheated with infrared. In some embodiments, the TPU film of the TPU layered nylon fabric has a weight of greater than 0.1 oz/yd$^2$ (e.g., greater than 0.5 oz/yd$^2$, from 0.5 to 2 oz/yd$^2$, etc.).

The wet coating compositions may be dried at elevated temperatures over a period which will vary depending on the actual temperature used, for example more than 100° F. (e.g., 100° F. to 200° F., 100° F. to 800° F., 100° F. to 1000° F., etc.) or more than 150° F. (e.g., 150° F. to 600° F., etc.) or more than 200° F. (e.g., 200° F. to 300° F., etc.). In some embodiments, the heating may occur for a period of up to ten minutes (e.g., up to one minute, up to two minutes, up to three minutes, up to four minutes, up to five minutes). Similar conditions may apply for the final curing of fabric composites. Such curing regimes may offer for further interfacial fusion of adjacent thermoplastic layers and/or removal of excess solvent following impregnation with liquid baths.

While its preferred that two identical sheets be fused together by heat welding the TPU from two separate TPU film coated fabrics, it is not necessary the two TPU film coated fabrics to be separate. Rather a single TPU film coated fabric may be folded over itself to produce the flame-retardant fabric composite. However, such a process is less desirable when manufacturing large quantities of the composite. In such embodiments, the flame-retardant may be manufactured by:

providing a TPU layered nylon fabric comprising, in order, (1) a woven nylon fabric sheet, optionally impregnated with thiourea formaldehyde flame-retardant and/or a fluorinated durable water repellant (DWR), (2) a flame-retardant polyurethane polymer layer, and (3) a thermoplastic polyurethane (TPU) layer; and forming a laminate by fusing together, interfacially, the TPU layer of two sections of the TPU layered nylon fabric.

Such composite fabrics are useful for fabrication of articles (e.g., garments, vests, packs, etc.). In further exemplary embodiments, the flame-retardant fabric may comprise laser-cut eyelets. These laser-cut eyelets may be used for hanging various types of external gear from the garment. Due to the nature and construction of the flame-retardant fabric composites, these laser cut fabrics allow for the attachment of items rather than the conventional methods of attachment such as incorporating loops of attached webbing into the article.

EXAMPLES

The following examples illustrate specific aspects of the instant description. The examples should not be construed as limiting, as the example merely provides specific understanding and practice of certain embodiments.

Example 1: Manufacture of Composite Fabrics

Several samples of composite flame-retardant fabric were prepared for flame-retardant analysis. Coating flame-retardant composition A, and adhesive composition B and the liquid bath solution for fiber impregnation used in the manufacture were prepared by mixing the components illustrated in Table 1. Weight percentages given in Table 1 are based on the weight of the entire composition.

TABLE 1

| Component | Weight Percentage |
|---|---|
| Composition A (Flame-retardant Polyurethane Composition) | |
| Polyurethane (halogenated) | 35-40% |
| Brominated Flame-Retardant (e.g., decadibromophenyl ethane, ethylene-bis tetrabromophthalimide, etc.) | 15-20% |
| Antimony based Flame-Retardant (e.g., antimony trioxide, antimony pentaoxide, etc.) | 1-4% |
| Aluminum Hydroxide | 4-5% |
| Trimethyl Melamine | 1-2% |
| Black Pigment | 1-2% |
| Organic Solvent | q.s. |
| Composition B (Adhesive Composition) | |
| Aromatic Polyether Polyurethane Resin Solution (38% non-volatile) | 47% |
| Brominated Flame-Retardant (e.g., ethylene-bis tetrabromophthalimide, etc.) | 20% |
| Antimony based Flame-Retardant (e.g., antimony trioxide) | 7% |
| Organic Solvent (e.g., blend of dimethylformamide, toluene, and methylethyl ketone) | q.s. |
| Liquid Bath Solution† | |
| Thiourea-Formaldehyde Condensate | 25-35% |
| Fluorinated Durable Water Repellant (e.g., Fluorinated Hexamethyl Polyacrylate) | 5-7% |
| Water | q.s. |

†The thiourea-formaldehyde condensate used was Flameout N15 (available from EMCO) at full strength. Flameout N15 was used at full strength which is 30% solids. The finished formula was formed from 93 Parts Flameout N15 and 7 parts Calpel FC6C.

Coating composition A was applied to one surface of longitudinally tensioned 500 Denier woven Nylon fabric (Westridge from Brookwood Companies, Inc.) with a floating knife. The coated fabric was then heated in an oven at 350° F. for 30-60 seconds to result in a dried flame-retardant coating layer weight of 1.3 to 1.7 oz/yd². A second layer of coating composition A was applied similarly over the dried flame-retardant polyurethane polymer layer of to result in a total dried coating layer of 2.0 to 2.5 oz/yd². Coating composition B was then applied similarly on top of the flame-retardant polyurethane polymer layer and heated at 250° F. for 60 to 120 seconds to produce an adhesive layer weight of 0.6 to 0.8 oz/yd².

A thermoplastic polyurethane film (84 shore A polyether polyurethane ST-4228 available from Argotec) was thermally laminated to the adhesive coated fabric by employing a pair of nip rollers comprising a rubber covered roller and a heated chrome roller maintained at 450° F. The film was applied to the surface under a 100 to 150 pli pressure at a speed resulting in peak bond line temperature of 250° to 275° F. to produce a TPU layered nylon fabric. A second TPU layered nylon fabric of equal length was prepared following the same procedure.

Using the same nip roller configuration, the film surface of one film-coated nylon surface was laminated with another each TPU layered nylon fabric such that the exposed film surfaces were in contact, interfacially. The two TPU layered nylon fabrics were laminated together with a heated roller temperature of 400° F., a pressure of 200 pli, and at a speed that attains good interfacial fusion of the TPU film layers. The additional use of a pre-heating zone comprising an infrared heater in close proximity to one of the film surfaces to be fused has been found to be effective at allowing higher production speeds when set to maintain a specific surface temperature such as 250° F.

The unimpregnated flame-retardant fabric composite was then dipped into the liquid bath solution followed by squeezing away excess liquid through a pair of pressured rubber nip rollers to impregnate the nylon with the components of the bath. The wet flame-retardant fabric composite was then subjected to 2 to 3 minute baking schedule at 350° F. to adequately drive off remaining solvent in the composite and simultaneously maximize the interfacial fusion of the internal TPU and coating layers.

Example 2: Testing of Fabric Composites

Various flame-retardant characteristics of the composites made as described in Example 1 where tested using ASTM D6413. Briefly, ASTM D6413 measures the vertical flame resistance of textiles to determine various flame-retardant parameters such as flame resistance, drips (from melting), after flame, char length, and after glow associated with the material. Specimens are positions vertically above a controlled flame and exposed to the flame for 12± 0.2 s. Parameters for five samples prepared as described in Example 1 were measured five separate times. The average measured warp values are shown in Table 2.

TABLE 2

| | Sample 1 | Sample 2 | Sample 3 | Sample 4 | Sample 5 |
|---|---|---|---|---|---|
| After flame (s; warp) | 0.0 | 0.0 | 0.0 | 0.0 | 0.0 |
| After flame (s; filling) | 0.0 | 0.0 | 0.0 | 0.0 | 0.0 |
| After glow (s; warp) | 0.0 | 0.0 | 0.0 | 0.0 | 0.0 |
| After glow (s; filling) | 0.0 | 0.0 | 0.0 | 0.0 | 0.0 |
| Drips (warp) | 0.0 | 0.0 | 0.0 | 0.0 | 0.0 |
| Drips (filling) | 0.0 | 0.0 | 0.0 | 0.0 | 0.0 |

TABLE 2-continued

|  | Sample 1 | Sample 2 | Sample 3 | Sample 4 | Sample 5 |
| --- | --- | --- | --- | --- | --- |
| Char length (inches; warp) | 3.0 | 2.6 | 2.7 | 3.1 | 2.6 |
| Char length (inches; filling) | 3.2 | 3.7 | 3.4 | 3.2 | 3.0 |

Each flame-retardant composite fabric was laundered five times and the flame-retardant test was repeated on each sample. Table 3 illustrates the flame-retardant characteristics measured with ASTM D6413 following repeated laundering of the flame-retardant fabric composites. As can be seen, the flame-retardant fabric composites described here have a variety of advantageous properties.

TABLE 3

|  | Sample 1 | Sample 2 | Sample 3 | Sample 4 | Sample 5 |
| --- | --- | --- | --- | --- | --- |
| After flame (s; warp) | 0.0 | 0.0 | 0.0 | 0.0 | 0.0 |
| After flame (s; filling) | 0.0 | 0.0 | 0.0 | 0.0 | 0.0 |
| After glow (s; warp) | 0.0 | 0.0 | 0.0 | 0.0 | 0.0 |
| After glow (s; filling) | 0.0 | 0.0 | 0.0 | 0.0 | 0.0 |
| Drips (warp) | 0.0 | 0.0 | 0.0 | 0.0 | 0.0 |
| Drips (filling) | 0.0 | 0.0 | 0.0 | 0.0 | 0.0 |
| Char length (inches; warp) | 2.5 | 2.5 | 2.6 | 2.3 | 2.2 |
| Char length (inches; filling) | 2.7 | 2.4 | 2.5 | 2.2 | 2.4 |

Additional characteristics of the flame-retardant fabric composites were measured with various protocols. Table 4 illustrates the average characteristics of flame retardant fabric composites produced as described in Example 1.

TABLE 4

|  | Protocol | Sample 1 | Sample 2 | Sample 3 | Sample 4 | Sample 5 |
| --- | --- | --- | --- | --- | --- | --- |
| Breaking Strength 4" Grab (warp) | ASTM D5034 | 535 lbs. force | 491 lbs. force | 533 lbs. force | 527 lbs. force | 507 lbs. force |
| Breaking Strength 4" Grab (filling) | ASTM D5034 | 379 lbs. force | 393 lbs. force | 397 lbs. force | 431 lbs. force | 407 lbs. force |
| Dimensional Stability - Commercial Laundering (warp) | AATCC 96 | 3.0% | 2.9% | 2.9% | 2.9% | 2.9% |
| Dimensional Stability - Commercial Laundering (filling) | AATCC 96 | 2.0% | 2.0% | 2.0% | 1.9% | 2.0% |
| Abrasion Resistance - Taber | ASTM D3884 | >800 Cycles | >800 Cycles | >800 Cycles | >800 Cycles | >800 Cycles |
| Water Resistance | AATCC127 or ASTM D751 | Leakage at 50+ cm | Leakage at 50+ cm | Leakage at 50+ cm | Leakage at 50+ cm | Leakage at 50+ cm |
| Water Repellency Dynamic Absorption (initial) | AATCC 70 | 13% | 13% | 15% | 13% | 13% |
| Oil Repellency (initial) | AATCC 118 | Pass | Pass | Pass | Pass | Pass |
| Oil Repellency (Laundered) | AATC 118 | Pass | Pass | Pass | Pass | Pass |

For the oil repellency tests, the composite fabric was considered to have passed if the fabric was not wet by N-tetradecane.

As various changes can be made in the above-described subject matter without departing from the scope and spirit of the present invention, it is intended that all subject matter contained in the above description, or defined in the appended claims, be interpreted as descriptive and illustrative of the present invention. Many modifications and variations of the present invention are possible in light of the above teachings. Accordingly, the present description is intended to embrace all such alternatives, modifications and variances which fall within the scope of the appended claims.

The invention claimed is:

1. A flame-retardant fabric composite comprising, in order:
   (a) a first woven nylon fabric sheet, optionally impregnated with thiourea formaldehyde flame-retardant and/or a fluorinated durable water repellant (DWR);
   (b) a first flame-retardant polyurethane polymer layer;
   (c) a thermoplastic polyurethane (TPU) layer;
   (d) a second flame-retardant polyurethane polymer layer;
   (e) a second woven nylon fabric sheet, optionally impregnated with thiourea formaldehyde flame-retardant and/or a fluorinated durable water repellant (DWR);
   (f) a first thermosetting polymer adhesive layer disposed between said first flame-retardant polymer layer and said thermoplastic polyurethane; and
   (g) a second thermosetting polymer adhesive layer disposed between said thermoplastic polyurethane and said second flame-retardant polyurethane polymer;
   wherein said first and second flame-retardant polyurethane polymer layers each independently comprise (1) an intrinsically flame-retardant thermoset polyurethane polymer comprising one or more halogenated monomers, and (2) a flame-retardant additive comprising one or more of a brominated flame-retardant, antimony trioxide, aluminum hydroxide, or melamine or a derivative thereof, and the flame-retardant fabric composite is characterized by an absence of drips in the ASTM D6413 Vertical Flame Test.

2. The flame-retardant fabric composite according to claim 1, characterized by an ASTM D6413 Vertical Flame Test of (1) less than a 3 second after-flame, (2) less than 2 second after-glow, and (3) less than 4.5 inch char length.

3. The flame-retardant fabric composite according to claim 1, wherein each of said first and second woven nylon fabric sheets are impregnated with a thiourea formaldehyde flame-retardant.

4. The flame-retardant fabric composite according to claim 1, wherein each of said first and second woven nylon fabric sheets are impregnated with a fluorinated durable water repellant.

5. The flame-retardant fabric composite according to claim 1, wherein each of said first and second woven nylon fabric sheets are composed of 500 denier nylon yarns.

6. The flame-retardant fabric composite according to claim 1, wherein said intrinsically flame-retardant polyurethane polymer comprises one or more brominated monomers.

7. The flame-retardant fabric composite according to claim 1, wherein said thermoplastic polyurethane layer comprises two laminated thermoplastic polyurethane films fused together.

* * * * *